US009180930B2

(12) United States Patent  (10) Patent No.: US 9,180,930 B2
Bettin  (45) Date of Patent: Nov. 10, 2015

(54) TRANSMISSION UNIT WITH A PLANETARY GEARING SYSTEM

(76) Inventor: Karsten Bettin, Hannover (DE)

( * ) Notice: Subject to any disclaimer, the term of this patent is extended or adjusted under 35 U.S.C. 154(b) by 0 days.

(21) Appl. No.: 14/118,248

(22) PCT Filed: May 6, 2012

(86) PCT No.: PCT/DE2012/100126
§ 371 (c)(1),
(2), (4) Date: Nov. 18, 2013

(87) PCT Pub. No.: WO2012/155895
PCT Pub. Date: Nov. 22, 2012

(65) Prior Publication Data
US 2014/0284897 A1    Sep. 25, 2014

(30) Foreign Application Priority Data

May 18, 2011    (DE) .......................... 10 2011 050 447

(51) Int. Cl.
| | |
|---|---|
| *B62M 1/00* | (2010.01) |
| *B62M 11/02* | (2006.01) |
| *B62K 25/00* | (2006.01) |
| *B62M 11/16* | (2006.01) |
| *F16H 37/04* | (2006.01) |

(52) U.S. Cl.
CPC .............. *B62M 11/02* (2013.01); *B62K 25/005* (2013.01); *B62M 11/16* (2013.01); *F16H 37/04* (2013.01)

(58) Field of Classification Search
CPC .... A01B 12/006; B62K 25/005; B62M 11/16

USPC ......... 280/260, 261, 238; 475/276, 277, 278, 475/280, 281
See application file for complete search history.

(56) References Cited

U.S. PATENT DOCUMENTS

| | | | |
|---|---|---|---|
| 3,513,725 A | 5/1970 | Shimano et al. | |
| 3,623,749 A | 11/1971 | Jensen | |
| 3,944,253 A | 3/1976 | Ripley, III | |
| 4,400,999 A | 8/1983 | Steuer | |
| 4,770,433 A * | 9/1988 | Hartmann | ..................... 280/260 |
| 5,154,676 A | 10/1992 | Kim | |

(Continued)

FOREIGN PATENT DOCUMENTS

| | | |
|---|---|---|
| DE | 2520129 A1 | 11/1975 |
| DE | 2940841 A1 | 4/1981 |

(Continued)

*Primary Examiner* — Kevin Hurley
*Assistant Examiner* — Marlon Arce
(74) *Attorney, Agent, or Firm* — Leydig, Voit & Mayer, Ltd.

(57) ABSTRACT

A transmission unit includes a planetary gearing system including a ring gear connected to a bicycle frame, a planet carrier with planet gears, and at least one sun gear that is engaged with the planet gears. A rear wheel shaft is coaxial with respect to the sun gear. A driving mechanism is operatively rotationally engaged with the planet carrier. At least one bearing is configured to bear the rear wheel shaft with respect to the bicycle frame and is arranged between the planetary gearing system and a seat of the rear wheel from an axial perspective. The bearing bears the rear wheel shaft inside from a radial perspective and is connected, either directly or indirectly, to the bicycle frame, externally from a radial perspective. The transmission unit provides at least one transmission ratio between a driving mechanism and the rear wheel shaft.

18 Claims, 11 Drawing Sheets

(56) References Cited

U.S. PATENT DOCUMENTS

| | | | |
|---|---|---|---|
| 5,186,482 A | | 2/1993 | Sapper |
| 5,454,766 A | * | 10/1995 | Mills ............................. 475/170 |
| 5,895,336 A | * | 4/1999 | Yoo ............................... 475/318 |
| 6,595,539 B1 | | 7/2003 | Belli |
| 6,799,771 B2 | | 10/2004 | Bigot |
| 6,878,084 B2 | * | 4/2005 | Hwang ........................ 475/214 |
| 7,229,089 B2 | | 6/2007 | Mihelic |
| 7,699,329 B2 | * | 4/2010 | Wesling et al. ............... 280/260 |
| 7,708,297 B2 | * | 5/2010 | Thorpe ....................... 280/281.1 |
| 8,794,651 B2 | * | 8/2014 | Serkh et al. .................. 280/261 |
| 2005/0035570 A1 | | 2/2005 | Chu |

FOREIGN PATENT DOCUMENTS

| | | |
|---|---|---|
| DE | 3905579 A1 | 8/1989 |
| DE | 3829691 A1 | 3/1990 |
| DE | 4203509 A1 | 8/1993 |
| DE | 19927700 A1 | 12/2000 |
| DE | 202006009235 U1 | 8/2006 |
| EP | 1600368 A2 | 11/2005 |
| JP | 2011511912 A | 4/2011 |
| WO | 2004087493 A1 | 10/2004 |
| WO | WO 2011031113 A2 | 3/2011 |
| WO | 2011102606 A2 | 8/2011 |

\* cited by examiner

Detail A

Detail A

US 9,180,930 B2

TRANSMISSION UNIT WITH A PLANETARY GEARING SYSTEM

CROSS REFERENCE TO RELATED APPLICATIONS

This application is a U.S. National Phase application under 35 U.S.C. §371 of International Application No. PCT/DE2012/100126, filed on May 6, 2012, and claims benefit to German Patent Application No. DE 10 2011 050 447.8, filed on May 18, 2011. The International Application was published in German on Nov. 22, 2012, as WO 2012/155895 A1 under PCT Article 21 (2).

FIELD

The invention relates to a transmission unit with a planetary gearing system, optionally for bicycles having small idle wheels or for trailer bicycles.

BACKGROUND

The chain drive is extremely widely used for driving bicycles. In this context, the drive chain wheel which is connected to the pedal is positioned predominantly outside the bicycle frame from an axial perspective, whilst the drive crown gear mounted on the rear wheel axle is arranged predominantly within the bicycle frame between the bicycle frame and the rear wheel from an axial perspective.

Multi-gear shifters for bicycles are preferably implemented by way of chain drives having various chain wheels on the pedal and various crown gears on the rear wheel or by way of single-level chain drives in combination with hub transmissions in the rear wheel or by way of a combination of these two solutions. Thus, in total, overall transmission ratios of up to 1:4.9 (for example SRAM i-motion with the chain wheel combination 48/18) are achieved. To achieve expedient deployments (distance covered per pedal rotation) with an appropriate ratio between distance travelled and pedalling frequency, these shifting combinations are used for idle wheel sizes of 28 to 16 inches.

Bicycles having small idle wheels are preferably used so as to achieve small packaging sizes and weights, and are often in the form of folding bicycles. Bicycles having idle wheels of 14 inches and less require a transmission ratio between the pedal frequency and the idle wheel frequency of at least 1:5 so as to achieve an expedient deployment.

Moreover, trailer bicycles for bicycles are known, which are trailed on the rear of a bicycle and generally have much smaller idle wheels than the bicycles on which they trail. Until now, transmissions having similar transmission ratios to those of the bicycles themselves have generally been used for these trailer bicycles. Thus, the person who is riding on the trailer bicycle has to pedal at much higher pedal frequencies than the person on the bicycle on which the trailer bicycle trails. Even trailer bicycles with small idle wheels require the aforementioned transmission ratios between the pedal frequency and the idle wheel frequency.

To achieve the aforementioned overall transmission ratios of approximately 1:5 and less for bicycles having idle wheel sizes of 14 inches and less, the following solutions are known:

a. In particular for the idle wheel size of 14 inches, a chain drive is occasionally used, having a particularly large drive chain wheel (for example having 53 teeth) arranged outside the bicycle frame and a particularly small driven crown gear (for example having 11 teeth), the driven crown gear being arranged between the bicycle frame and the rear wheel in an axial perspective.

b. In the Dreamslide bicycle from Dreamslide S.A., Bures-sur-Yvette, France, a particularly large driving mechanism chain wheel and a particularly small driven crown gear are likewise used, the drive chain wheel and the driven crown gear being arranged inside the bicycle frame in an axial perspective.

c. Using two chain drives in succession (for example U.S. Pat. No. 3,623,749 A, EP 1 600 368 A2, U.S. Pat. Nos. 5,186,482 A, 7,229,089 B2, 6,595,539 B1, US 2005/0 035 570 A1, U.S. Pat. No. 6,799,771 B2).

d. Using a planetary gearing system having a stationary ring gear and a driven sun gear on the pedal in combination with a chain drive (DE 39 05 579 A1 and high speed drive from Schlumpf Innovations GmbH, Vilters/Switzerland).

e. Using a planetary gearing system having a stationary ring gear and a driven sun gear on the rear wheel in combination with a chain drive (for example DE 39 05 579 A1, and also U.S. Pat. No. 3,944,253 A in parts, FIG. 20 of WO 2011/102 606 A2).

Solution a. has the drawback that, because of the different arrangement of the drive chain wheel (outside) and the driven crown gear (inside) with respect to the bicycle frame, the bicycle frame has to be passed through between the chain wheels or over the chain drive. Because of a number of parameters (for example the large chain wheels required and the small driven crown gear, the frame shape, the required frame strengths, the required distance of the rear wheel from the bicycle frame, the arrangement of a suitable brake, the construction conditions for the rear wheel and the chain), in this context a minimum distance, which can be determined as a function of the idle wheel size, has to be maintained between the pedal axle and the rear wheel axle. In an embodiment as a folding bicycle, this minimum distance and the large drive chain wheel lead to a correspondingly large packaging size. By way of example, if a chain wheel combination of 53/11 is used, only an overall transmission ratio of 1:4.8 is achieved. There is therefore the further drawback that the achievable overall transmission ratio for idle wheel sizes smaller than 14 inches barely makes an appropriate deployment possible. Because of the resulting chain skew, an embodiment as a multi-gear derailleur gear set is only possible with a correspondingly long chain, and this in turn makes a determinable minimum distance necessary between the pedal axis and the rear wheel axis.

Solution b. has the following drawbacks:
The bicycle frame, the bottom bracket and the chain wheel have to be manufactured, mounted and maintained as separate components, at a correspondingly high cost. The special embodiment of the chain wheel prevents the use of multiple chain wheels. Likewise, because of the special drive chain wheel, the arrangement of the brakes and the requirements for the bicycle frame, a minimum distance, which can again be determined as a function of the idle wheel size, is necessary between the pedal axis and the rear wheel axis, and in an embodiment as a folding bicycle would in turn result in a correspondingly large packaging size.

Solution c. has the following drawbacks:
Because of the two chain drives which are to be implemented in series, the double chain drive requires a relatively large horizontal distance between the pedal axis and the rear wheel axis. As a result, the folded length of a folding bicycle is relatively large, and the directional stability is lessened as a result of the lower rider weight on the rear wheel. As a single-gear transmission, these solutions require at least two transmission ratios (2 chain drives). As a multi-gear transmission, these solutions would require at least three transmission ratios (2 chain drives and a multi-gear hub shifter in the rear wheel). The resulting high rotational speed of the second chain drive requires a high expenditure of energy.

Solution d. has the following drawbacks:
The torque is introduced from the pedal onto the pedal bearing shaft. Because of the high pedal forces which have not yet been transmitted and because of the relatively low diameter of the pedal bearing shaft, the shaft-hub connection between the pedal bearing shaft and the planet carrier of a downstream planetary gearing system has to be dimensioned correspondingly large, or be provided in a material fit as in DE 39 05 579 A1. The gearwheels which are to be used in the planetary gearing system on the pedal likewise have to be made relatively large and thus also relatively heavy. The resulting high rotational speed of the chain drive requires a high expenditure of energy.

The variant disclosed in DE 39 05 579 A1 in relation to solution e. has the following drawbacks:
The planet carrier of the planetary gearing system and the driven crown gear of the chain drive are positioned on different sides of the bicycle frame in an axial perspective. This results in the drawback that the torque of the driven crown gear initially has to be transmitted to the rear wheel shaft before it can be received on the other side of the bicycle frame by the planet carrier. The rear shaft and any shaft-hub connections between the driven crown gear and the rear wheel shaft or between the rear wheel shaft and the planet carrier have to be able to receive a high torque. Thus, either the planet carrier and the rear wheel shaft have to be produced in a single piece, as disclosed in DE 39 05 579 A1, resulting in very high material waste and costs for the rear wheel shaft, or a correspondingly large shaft-hub connection has to be provided between the rear wheel shaft and the planet carrier. Overall, the known variant makes a considerable axial installation space necessary between the chain line and the central reference plane of the bicycle. A further drawback is that, in the known solution, the bending moment acting on the rear wheel shaft as a result of the rider's weight also acts on the planet carrier and is detrimental to the tooth engagement of the planetary gearing system. In addition, with the arrangement of the planetary gearing system on the inside of the bicycle frame, only one gear ratio of the planetary gearing system can be implemented, since the arrangement of the driven sun gear as a sun gear mounted on the rear wheel shaft means that, as seen from the sun gear, the torque can only be transmitted in the axial direction with respect to the rear wheel.

The variants disclosed in U.S. Pat. No. 3,944,253 A or in DE 25 20 129 A1 and in FIG. 20 of WO 2011/102 606 A2 in relation to solution e. have the following drawbacks:
As a result of the different arrangement of the drive chain wheel (outside) and the driven crown gear (inside) with respect to the bicycle frame, the bicycle frame has to be passed through between the chain wheels, with the drawbacks described previously in point a. above. Moreover, with the arrangement of the planetary gearing system on the inside of the bicycle frame, only one gear ratio of the planetary gearing system can be implemented, since the arrangement of the driven sun gear as a sun gear mounted on the rear wheel axles means that, as seen from the sun gear, the torque can only be transmitted in the axial direction with respect to the rear wheel.

SUMMARY

In an embodiment, the present invention provides a transmission unit including a planetary gearing system with a ring gear connected to a bicycle frame, a planet carrier with planet gears, and at least one sun gear that is engaged with the planet gears. A rear wheel shaft is coaxial with respect to the sun gear. A driving mechanism is operatively rotationally engaged with the planet carrier. At least one bearing is configured to bear the rear wheel shaft with respect to the bicycle frame and is arranged between the planetary gearing system and a seat of the rear wheel from an axial perspective. The bearing bears the rear wheel shaft inside from a radial perspective and is connected, either directly or indirectly, to the bicycle frame, externally from a radial perspective. The transmission unit provides at least one transmission ratio between a driving mechanism and the rear wheel shaft.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a sectional view of the two-gear transmission unit comprising a spur gear jaw freewheel clutch and a single-arm suspension.

DETAILED DESCRIPTION

Figure 1:
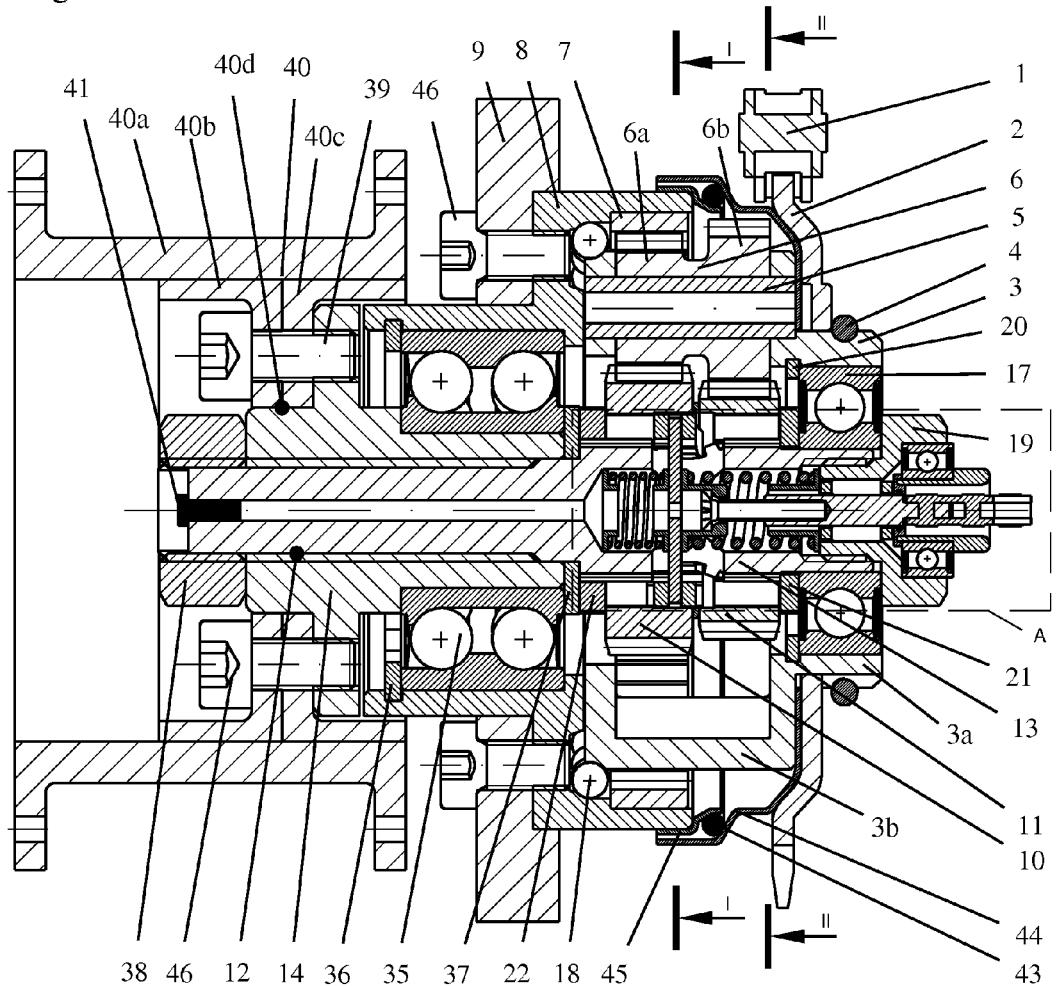
FIG. 1 shows a preferred embodiment of the two-gear transmission unit, comprising a shiftable spur gear jaw freewheel clutch and a single-arm suspension of the transmission unit in the bicycle frame, meaning, in combination with an upstream endless chain drive comprising a triple chain wheel, that a six-gear transmission having uniform gear shifting can be implemented.
Figure 1:
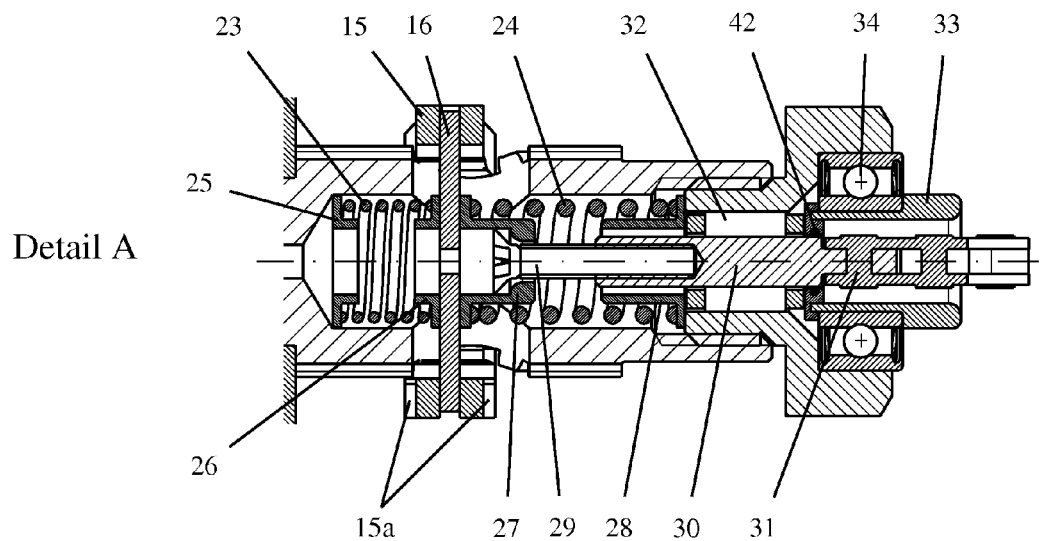

An aspect of the invention is to develop a transmission solution, optionally for bicycles or for trailer bicycles, likewise corresponding to the aforementioned solution e., without the aforementioned drawbacks of the variants disclosed in DE 39 05 579 A1, DE 25 20 129 A1 and FIG. 20 of WO 2011/102 606 A2, the transmission unit optionally being adapted for operating various types of traction mechanism transmissions (gear drive and belt drive) or spur gear transmissions upstream from the gear unit.

Further advantageous embodiments of the invention may be derived from the dependent claims. Aside from preventing the aforementioned drawbacks of DE 39 05 579 A1, DE 25 20 129 A1 and FIG. 20 of WO 2011/102 606 A2, major advantages of the invention are a. that the sun gear does not have to be mounted separately, and shifting means, which make it possible to configure two sun gears arranged side by side and thus two settable gear ratios of the transmission unit, can be provided inside the sun gear from a radial perspective.
b. that by means of the transmission unit, in combination with an upstream chain drive having various chain wheels on the pedal and/or various driven crown gears for the bicycle, a multi-gear transmission can be implemented, comprising up to six gear ratios and having uniform gear shifting.
c. that both variants for single-arm suspension in the bicycle frame and variants for suspension provided on both sides of the rear wheel can be configured for the transmission unit.
d. that the transmission unit can be used in particular for bicycles having small idle wheel sizes of 6 to 16 inches, and thus very small axial distances between the pedal axle and the rear wheel axle can be implemented, so as for example to achieve small folded sizes for folding bicycles.
e. that the transmission unit contains a freewheel clutch which is arranged between the sun gear or sun gears and the rear wheel shaft, and thus a freewheel clutch need not be provided either inside the idle wheel or between the driven wheel of a traction mechanism transmission or spur gear transmission upstream from the transmission unit and the driving mechanism of the transmission unit, meaning that different shapes of idle wheels can be used and can be rigidly connected to the transmission unit, and meaning that the same transmission unit can be adapted to different idle wheel sizes whilst being able to achieve the same deployment, simply by changing the drive wheel, which is rotationally engaged with the driving mechanism at least in one direction of rotation, of the traction mechanism transmission or spur gear transmission.
f. that all of the transmission parts of the bicycle, namely the planetary gearing system, the drive wheel and driven wheel of the traction mechanism transmission or spur gear transmission, the shifting means and the freewheel clutch, can be mounted and dismounted on the same side of the bicycle frame.
g. that, as a result of the transmission components being configured particularly compactly by way of the features of the dependent claims, ergonomically favourable chain line distances can be achieved, which may be less than 40 mm.

The driven wheel 2, which is driven by a chain 1 or a V-belt or tooth belt or a spur gear (not shown separately), of an endless chain or belt drive upstream from the transmission unit or of a spur gear transmission upstream from the transmission unit is operatively rotationally engaged with a driving mechanism 3 of the transmission unit via a shaft-hub connection, the driven wheel 2 being secured to the driving mechanism 3 by way of a retaining ring 4 for example. The driving mechanism 3, which is driven by the driven wheel 2, consists of a driving mechanism part 3a and in accordance with a particular feature of the invention is formed as a planet carrier 3b of a planetary gearing system from an axial perspective towards the bicycle frame.

In accordance with a particular feature of the invention, the driven wheel 2 and the planet carrier 3b are positioned outside the bicycle frame from an axial perspective. This makes it possible to install and uninstall the chain 1 or also to change the driven wheel 2 so as to implement different transmission ratios of the transmission unit, without the rear wheel having to be uninstalled at the same time. This also makes it possible to use V-belts or toothed belts or to use spur gear transmissions, without the bicycle having to be separated to install and uninstall the belt. As well as the embodiment shown, any embodiments comprising the chain drives, V-belts or toothed belt drives or spur gear transmissions are also included in the invention. In this case, merely the driven wheel 2 and optionally the hub-shaft connection between the driven wheel 2 and the driving mechanism part 3a of the driving mechanism 3 would have to be modified.

If, in accordance with a particular feature of the invention, a cranked driven wheel 2 is used as shown, the axial distance between the chain line and the rear wheel is reduced, meaning that an arrangement of the planetary gearing system which is very compact from an axial perspective is achieved. The arrangement further makes it possible for the driven wheel, driving mechanism and planet carrier alternatively to be manufactured in a single piece, for example as an extruded part, in particular for mass production. This embodiment is also included in the invention.

The planet carrier 3b guides at least one, preferably three planet axes 5, on each of which a planet gear 6 having two ratios 6a and 6b is borne, the ratio 6a having a smaller diameter and the ratio 6b having a larger diameter. Only the ratio 6a meshes with the ring gear 7 of the planetary gearing system. The ring gear 7 is rigidly connected to the bicycle frame 9 via a ring gear carrier 8. The ratio 6a of the planet gears 6 meshes with the sun gear 10 and the ratio 6b of the planet gears meshes with the sun gear 11. The sun gears 10 and 11 are arranged coaxially with a rear wheel shaft 12, which in this embodiment is formed in two parts in accordance with a particular feature of the invention, consisting of a first shaft part, referred to as a drive shaft 13 in the following, and a second shaft part, coaxially connected to the first shaft part and referred to as a rear wheel flange 14 in the following. The input torque for the transmission unit is transmitted from the driven wheel 2 to the driving mechanism pat 3a of the driving mechanism 3 for the planetary gearing system 3b. From the planet carrier 3b, the torque is converted and transmitted via the planet gears 6a and 6b to the sun gears 10 and 11 respectively.

From the sun gears 10 and 11, the torque is transmitted to the drive shaft 13 by means of an axially displaceable clutch member 15 which is operatively rotationally engaged with the drive shaft 13. For this purpose, in accordance with a particular feature of the invention, radial teeth 15a are arranged distributed uniformly on the periphery on both end faces of the clutch member 15, and can engage in corresponding recesses of the sun gears 10 and 11 respectively.

The radial teeth 15a of the clutch member 15 are pressed axially into the recesses of the respective sun gear 10 or 11, in FIG. 1 into those of the sun gear 10, by a compression plate 16, which penetrates the rear wheel shaft 12 perpendicular to the axis thereof, is arranged in a corresponding recess of the rear wheel shaft 12 and is guided in corresponding recesses of the clutch member 15.

In accordance with a particular feature of the invention, the driving mechanism 3 which forms the planet carrier 3b is borne by the bearing 17 on the drive shaft 13 and by the bearing 18 in the ring gear carrier 8. The bearing 17 is pressed against a retaining ring 20, which is attached in the driving mechanism 3, by a fixing screw 19. The planet carrier 3b subsequently presses the ball bearing 18 against the ring gear carrier 8, leading to secure bearing of the driving mechanism 3. The spacers 21 and 22 ensure that the sun gears 10 and 11 are guided reliably from an axial perspective.

In the following, the operation of the two-gear shifting of the transmission unit is described with reference to detail A of FIG. 1:

In accordance with a particular feature of the invention, to implement the first gear ratio α weaker compression spring 23 and a stronger compression spring 24, which are accommodated in guide bushings 25, 26, 27 and 28, exert an axial force on the compression plate 16. If both compression springs 23 and 24 exert the force thereof on the compression plate 16, in accordance with a particular feature of the invention the radial teeth 15a of the clutch member 15 are pressed into the recesses of the sun gear 10 by the compression plate 16 as a result of the greater force of the compression spring 24. In this context, the difference between the spring forces of the compression springs 23 and 24 approximately corresponds to the spring force of the compression spring 23. In this case, the torque is transmitted to the sun gear 10 by the planet carrier 3b via the ratio 6a of the planet gears 6, which are braced against the ring gear 7, and from the sun gear 10 to the drive shaft 13 via the clutch member 15, whilst the sun gear 11 rotates freely on the drive shaft 13. In this way, the first gear ratio of the transmission unit is implemented.

In accordance with a further particular feature of the invention, the second gear ratio is set using the construction and mechanism disclosed in the following:

A shifting screw 29—preferably comprising a left-handed thread—is guided inside the guide bushing 27, and is in turn screwed to a shifting nut 30.

The shifting nut 30 is part of a shifting chain 31 comprising chain links, which is connected to a suitable Bowden cable (not shown here). The shifting nut 30 is guided in a needle bearing 32, which is in turn borne in the fixing screw 19. The chain links of the shifting chain 31 are braced in a guide bushing 33, which is borne in the fixing screw 19 by means of a bearing 34.

For mounting the shifting nut 30 to the shifting screw 29, the drive shaft 13 and the compression plate 16 each comprise a hole which is coaxial with the drive shaft 13 and into which a screw driving mechanism can be introduced to hold the shifting screw 29 in place.

Since the shifting screw 29, the shifting nut 30, the shifting chain 31 and the guide bushing 33 cannot rotate together with the drive shaft 13, they are borne by the needle bearing 32 and the bearing 34 in the drive shaft 13.

Figure 2:
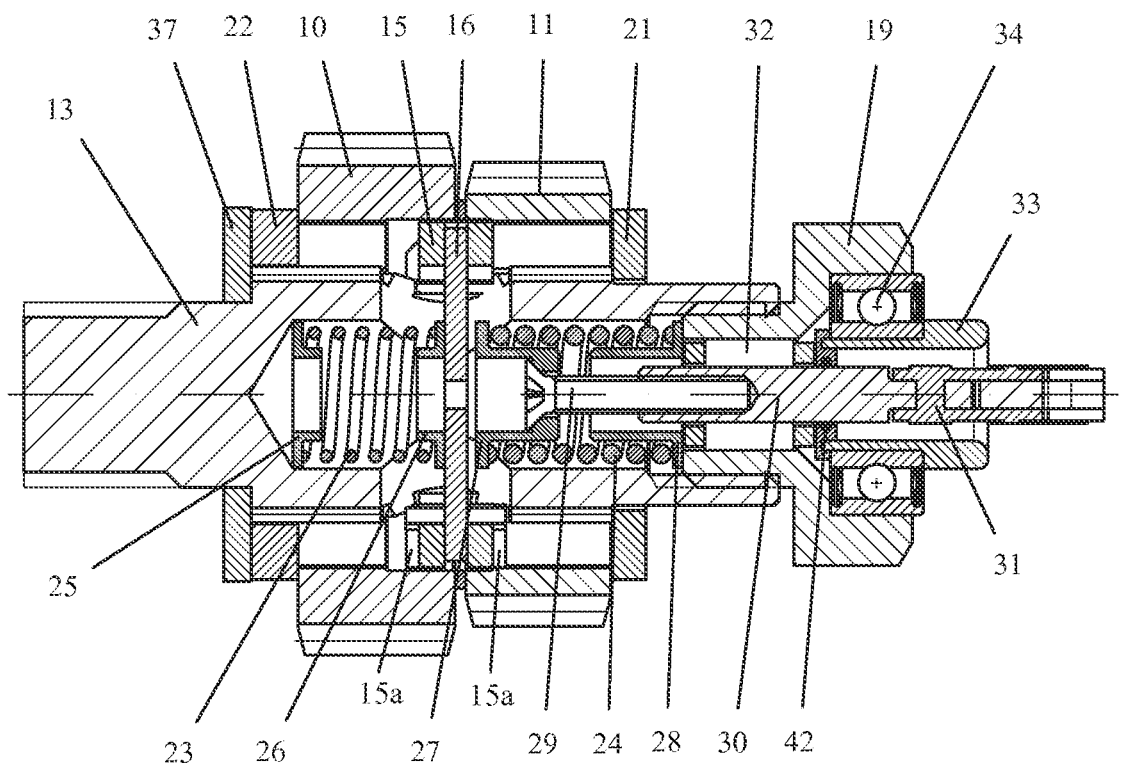
FIG. 2 shows the shifting part of the two-gear transmission unit comprising a spur gear jaw freewheel clutch of FIG. 1, the second gear being set in this case.

If the shifting chain 31 of the Bowden cable is pulled out of the drive shaft 13, the shifting screw 29 entrains the guide bushing 27. The guide bushing 27 compresses the compression spring 24. The shifting chain 31 is pulled out of the drive shaft 13 until the guide bushing 27 and the compression spring 24 have reliably lost contact with the compression plate 16. Since the compression spring 24 is now no longer exerting any force on the compression plate 16, the weaker compression spring 23 presses the compression plate 16 and thus the radial teeth 15a of the clutch member 15 into the recesses of the sun gear 11. The torque is now transmitted from the planet carrier 3b, via the ratio 6a off the planet gears 6 which are braced on the ring gear 7, to the ratio 6b of the planet gears 6 and to the sun gear 11, and from the sun gear 11, via the clutch member 15, to the drive shaft 13, whilst the sun gear 10 rotates freely on the drive shaft 13. In this way, the second gear ratio of the transmission unit is implemented. Setting the second gear ratio is shown in FIG. 2.

In accordance with a further particular feature of the invention, the spring excursion of the compression spring 24 is delimited by the guide bushings 27 and 28 so as to avoid load spikes. The compression spring 24 can only be compressed until the guide bushings 27 and 28 touch one another. At the same time, this also ensures that the shifting chain 31 can only be pulled sufficiently far to the right that no lever forces can act on the shifting nut 30.

Alternatively, although this is not shown here, the shifting nut 30 may be in the form of a threaded sleeve, in which case the shifting screw is screwed to the threaded sleeve and a second screw, which is screwed into the threaded sleeve from the other side, is connected to the shifting chain 31. This embodiment is also included in the invention. In the embodiment shown in FIG. 1 of the transmission unit, the drive shaft 13 and the rear wheel flange 14 are interconnected by way of a threaded connection, which transmits the torque of the drive shaft 13 to the rear wheel flange 14.

In accordance with a particular feature of the invention, the rear wheel flange 14 is borne internally, from a radial perspective, in a double-row bearing, preferably a double-row angular contact ball bearing 35, which from a radial perspective is borne outside the ring gear carrier 8, which in accordance with a further preferred feature of the invention additionally comprises a bearing shell for this purpose. The ring gear carrier 8 is connected to the bicycle frame 9. The angular contact ball bearing 35 is axially fixed in the ring gear carrier 8 by means of a retaining ring 36. Between the angular contact ball bearing 35 and the drive shaft 13 from an axial perspective, a washer 37 acts as a shaft-side support shoulder for the angular contact ball bearing 35. A nut 38 secures the rear wheel flange 14 against the washer 37 together with the drive shaft 13. In this embodiment, the rear wheel flange 14 comprises on the periphery at least three, preferably four or five nut threads, onto which a rear wheel 40, in this embodiment in the form of a spoked wheel hub 40a comprising connection elements 40b and 40c and rear wheel seat 40d between the wheel hub 40a and the rear wheel flange 14, can be screwed on by means of screws 39. The transmission unit is sealed from the environment by means of the sealed bearings 17, 34, 35, the plug 41 and the sealing rings 42 and 43. The sealing ring 43 is guided between a sealing cap 44, which is gripped between the driven wheel 2 and the planet carried 3b, and an applied cap 45, which comprises a rising slope and is rigidly connected to the ring gear carrier 8. For mounting purposes, the sealing ring 43 is slid onto the applied cap 45. Subsequently, the sealing cap 44 is pressed against the sealing ring 43, in such a way that, in accordance with a further particular feature of the invention, said ring is pressed in the direction of the rising slope of the applied cap 45, resulting in a low-friction, compact, dynamic seal, for low-viscosity lubricants, of the rotatably mounted planet carrier 3b against the ring gear carrier 8 which is rigidly connected to the bicycle frame 9.

The transmission unit is connected to the bicycle frame 9 using fixing screws 46. The fixing screws 46 transmit the reaction torque of the ring gear 7, which is rigidly connected to the ring gear carrier 8, to the bicycle frame 9.

So as to centre the drive shaft 13 and the rear wheel flange 14 radially, the drive shaft 13 comprises a centring flange. The rear wheel flange 14 also comprises a centring flange for the rear wheel 40.

FIG. 2 shows the shifting part of the two-gear transmission unit comprising a spur gear jaw freewheel clutch, the radial teeth 15a of the clutch member 15 engaging in the recesses of the sun gear 11 and setting the second gear ratio of the transmission unit in this case.

Figure 3:
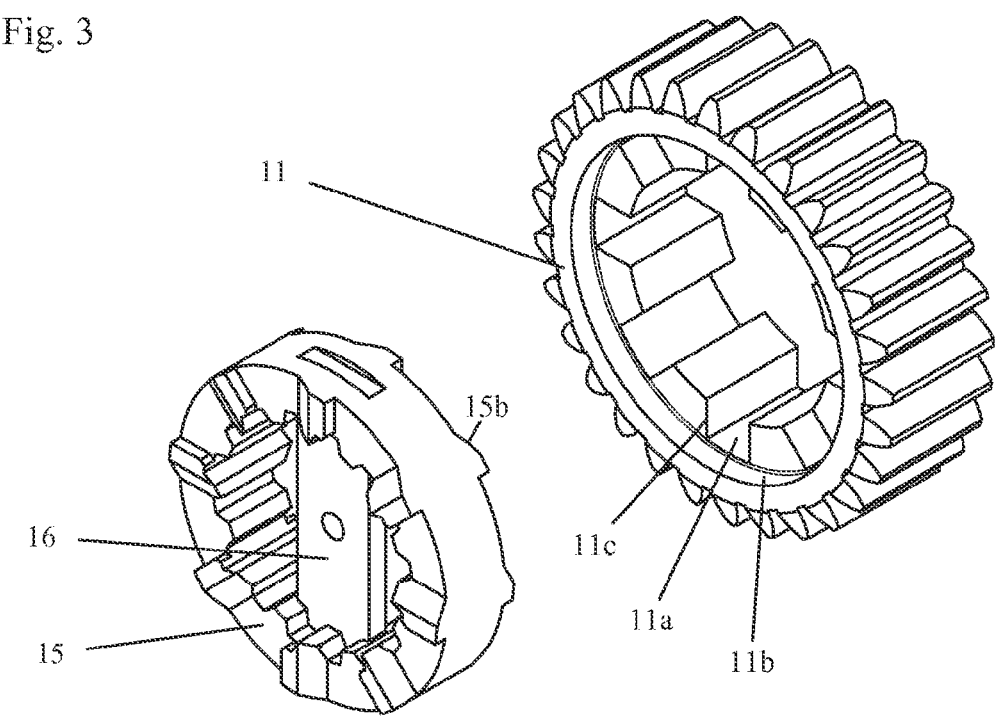
FIG. 3 and FIG. 4 are exploded views of the spur gear jaw clutch of FIG. 1 in two preferred embodiments.
Figure 4:
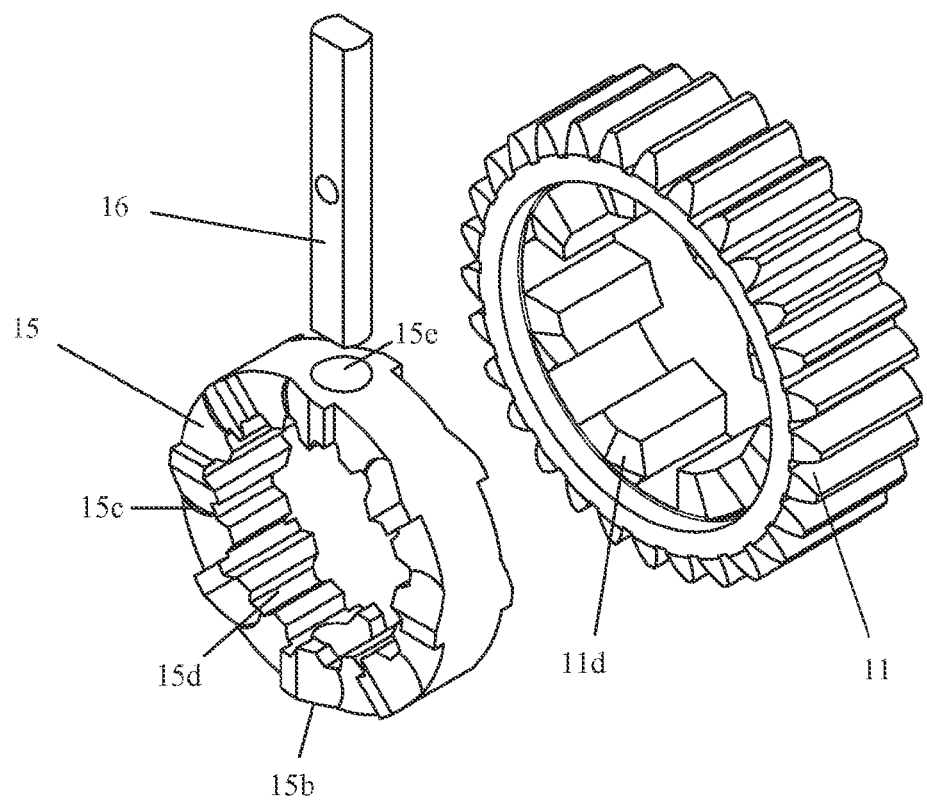

In the following, using the example of the second gear ratio, with supplementary reference to FIG. 3 and FIG. 4, the operation of the freewheel clutch is described, the description also applying analogously to the first gear ratio:

FIG. 3 and FIG. 4 are exploded views of the sun gear 11, the clutch member 15 and the compression plate 16 in two preferred embodiments. In accordance with a particular feature of the invention, on the two end faces the clutch member 15 comprises radial teeth 15a which are distributed on the periphery. The radial teeth 15a in turn each comprise a bevel 15b on the face pointing in the direction of rotation. In accordance with a further particular feature of the invention, the sun gear 11 comprises axially continuous recesses 11a, in which the radial teeth 15a of the clutch member 15 engage, so as to transmit the torque from the driven sun gear 11 to the clutch member 15. If the sun gear 11 is no longer driven, the clutch member 15 which is operatively rotationally engaged with the rear wheel shaft continues to rotate. As a result, the clutch member 15 is pressed out of the positive fit with the sun gear 11 by way of the bevel 15b. This clutch connection between the sun gear 11 and the clutch member 15 is referred to in the following as a radial tooth jaw clutch.

The axially continuous recesses 11a in the sun gears 10 and 11 have two advantages. In accordance with a particular feature of the invention, the clutch can be placed inside the sun gears 10 and 11 from an axial perspective and between the rear wheel shaft and the toothing of the sun gears 10 and 11 from a radial perspective, meaning that on the one hand no additional installation space going beyond the width of the sun gears 10 and 11 is required, and on the other hand no radial toothing, to be formed on the end face, has to be provided on the sun gear 10 or 11. Instead, the sun gears 10 and 11 can be manufactured over a greater length and then cut to length. The required space for the clutch member 15 is created inside the sun gear 11 by way of a simple hole 11b. In connection with the compression spring 23, which displaces the compression plate 16 and the clutch member 15 against the sun gear 11, a freewheel clutch is implemented in that, in the case of freewheeling, the clutch member 15 is pressed out of the sun gear 11, which is idle in the case of freewheeling, by the bevel 15b, and compresses the compression spring 23, whilst the compression spring 23 presses the compression plate 16 and the clutch member 15 against the sun gear 11 and subsequently engages the radial tooth jaw clutch again when the sun gear 11, which is being driven again, overtakes the drive shaft 13 again. So as to ensure reliable decoupling in the case of freewheeling, at the position denoted as 15c in FIG. 4 the bevels 15b of the radial teeth 15a penetrate somewhat deeper into the end faces of the clutch member 15. Involute toothing 15d is provided inside the clutch member 15 from a radial perspective, and transmits the torque from the clutch member 15 to the drive shaft 13.

In accordance with a particular feature of the invention, to transmit the torque from the clutch member 15 to the drive shaft 13, involute toothing 15d of modulus 0.8 having 16 teeth in accordance with DIN 5480 is used, meaning that the number of teeth is divisible by four and the root circle diameter is somewhat greater than 12 mm and the root circle diameter is somewhat less than 14 mm. By contrast, in accordance with a further particular feature of the invention, eight teeth, and thus again a number of teeth which is divisible by four, are provided for the radial toothing of the clutch member 15. The symmetry achieved by way of the numbers of teeth which are divisible by four enables simple manufacture of the clutch member 15 and the sun gears 10 and 11.

Finally, both the clutch member 15 and the sun gears 10 and 11 can be produced purely by chipping methods. In particular, no cast parts are needed for cost-effective small-scale production.

FIG. 3 also shows the embodiment shown in FIG. 1 of the clutch member 15 comprising the compression plate 16.

In FIG. 4, in accordance with a further particular feature of the invention, a clutch member 15 is shown which is even simpler to manufacture, a round compression rod 16 which is flattened on both faces being used instead of a compression piece in this case, and it being possible, in accordance with a further particular feature of the invention, to produce the recesses of the clutch member 15 for guiding the compression rod 16 by way of a simple hole 15e. So as to prevent the risk of the wear on the edges 11c of the sun gear 11 in freewheel operation, in FIG. 4, in accordance with a particular feature of the invention, the sun gear 11 comprises millable bevels 11d, which have the same angle of inclination as the bevels 15b of the clutch member. In the case of freewheeling, the clutch member 15 is pressed out of the sun gear by means of these bevels 11d.

In accordance with a further particular feature of the invention, the arrangement of the freewheel clutch between the sun gear 10, 11 and the drive shaft 13 means that a much lower torque has to be transmitted than if the freewheel clutch is arranged upstream from the planetary gearing system.

Figure 5:
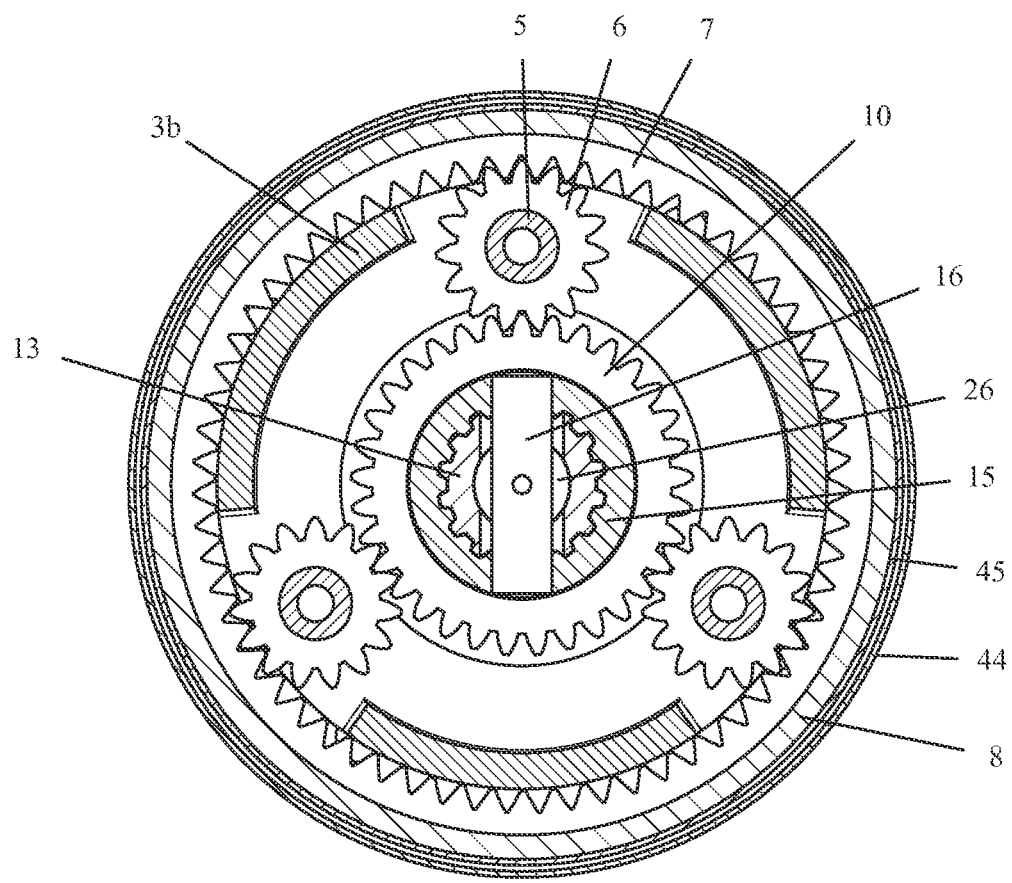
FIG. 5 is the sectional view I-I through the first gear ratio of the planetary gearing system of FIG. 1.

FIG. 5 is the sectional view I-I through the first gear ratio of the transmission unit, the bicycle frame 9 and the rear wheel 40, which is arranged behind the bicycle frame 9 as seen from the section plane I-I, not being shown.

Figure 6:
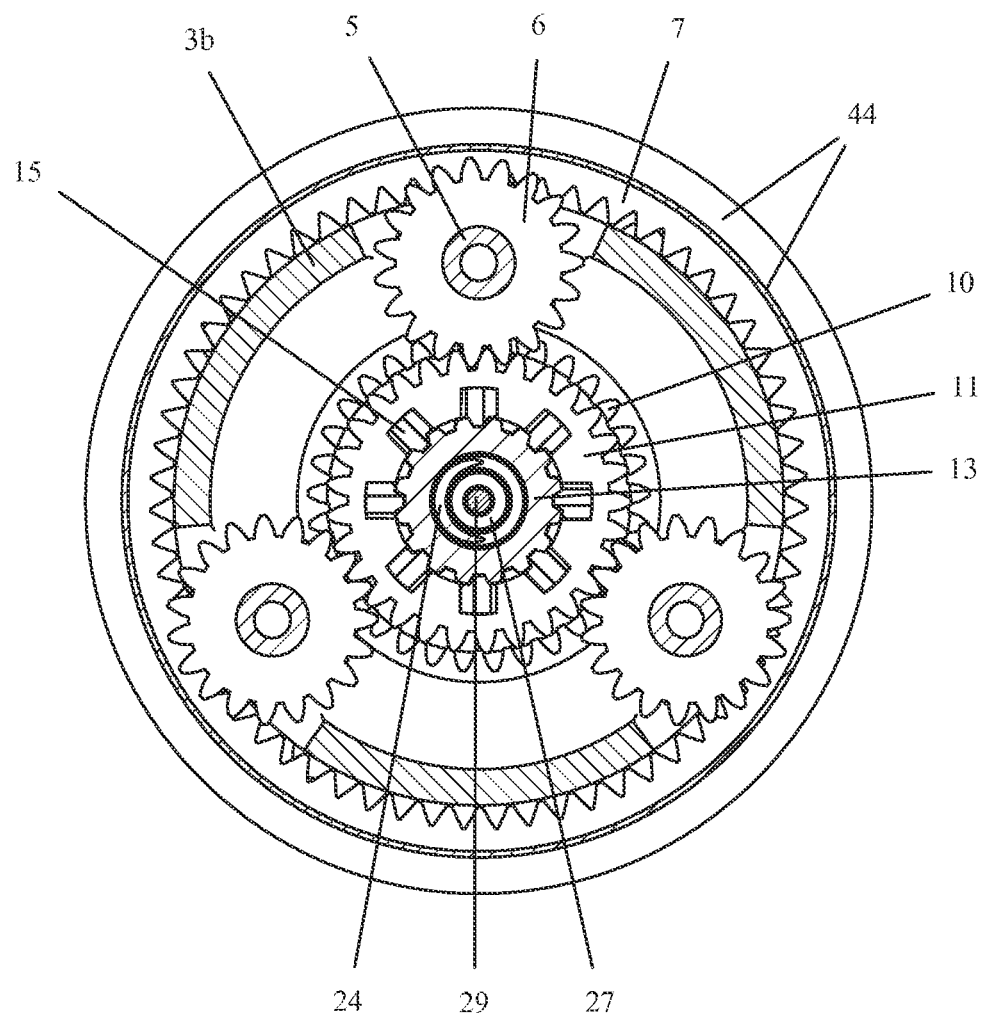
FIG. 6 is the sectional view II-II through the second gear ratio of the planetary gearing system of FIG. 1.

FIG. 6 is the sectional view II-II through the second gear ratio of the transmission unit, the chain 1, the bicycle frame 9 and the rear wheel 40, which is arranged behind the bicycle frame 9 as seen from the section plane II-II, not being shown, and the ring gear carrier 8 being covered by the sealing cap 44.

Figure 7:
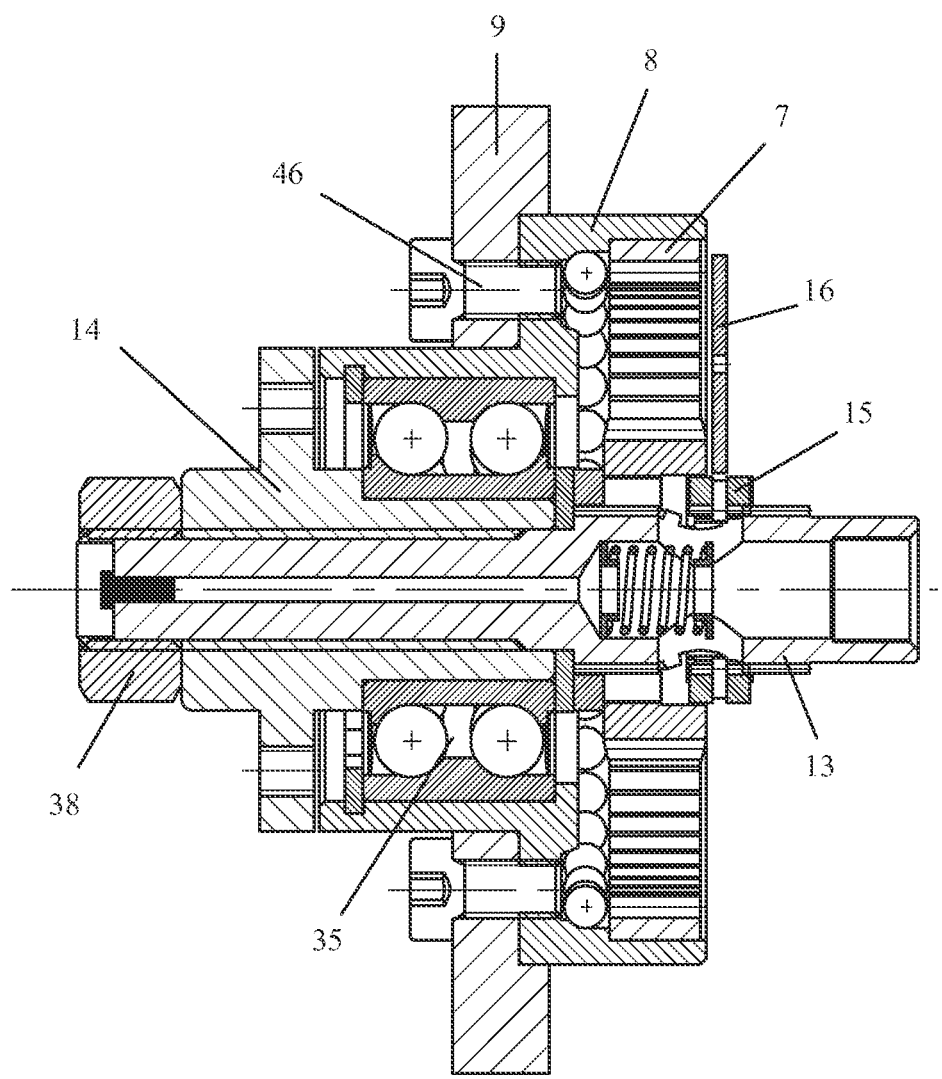
FIG. 7 shows how the freewheel clutch can be mounted without the need to assemble major parts of the transmission unit.

In accordance with a particular feature of the invention, the external diameters of the drive shaft 13 and the rear wheel flange 14 may be greater at the outer, non-interconnected ends than at the level of the angular contact ball bearing 35 from an axial perspective. As is shown in FIG. 7, in accordance with a particular feature of the invention, the clutch member 15 and the compression plate 16 can be installed and uninstalled past the ring gear 7, without the ring gear 7, ring gear carrier 8, drive shaft 13, rear wheel flange 14 or angular contact ball bearing 35 having to be released from one another. In this way, the required rigid fits can be provided between the angular contact ball bearing 35 and the rear wheel flange 14 and optionally between the angular contact ball bearing 35 and the ring gear carrier 8. For the purpose of installing and uninstalling the compression plate 16, the clutch member 15, together with the compression plate 16, is guided into the recesses of the drive shaft 13 as far as the driving mechanism-side stop of the compression plate 16, and subsequently pushed into or out of the clutch member 15 past the ring gear 7.

Further, in accordance with a further particular feature of the invention, in this embodiment all of the components and functional regions related to the transmission, such as the driven wheel, the planetary gearing system, the freewheel clutch and the shifting means, are located on the same side of the bicycle frame as the driven wheel and the drive wheel of the traction mechanism transmission or spur gear transmission which drives the transmission unit. The chain belt, V-belt or toothed belt and any spur gears can be mounted and dismounted without disassembling the rear wheel, and the rear wheel can be connected directly to the rear wheel flange 14 on the other side of the bicycle frame 9 without further conversion or construction. As a result, for receiving the rear wheel and for transmitting the weight forces and torques from the rear wheel flange 14 to the rear wheel 40, aside from the embodiments shown, many embodiments of the rear wheel flange 14 which are already known for one-sided idle wheel fixings may be provided for the rear wheel flange 14. These embodiments are also included in the invention.

Also, various forms of rear wheels 40 may be used which either are screwed directly to the rear wheel flange 14 or, as shown in FIG. 1, can be connected to the rear wheel flange 14 via additional elements 40a, 40b of the rear wheel 40.

Figure 8:
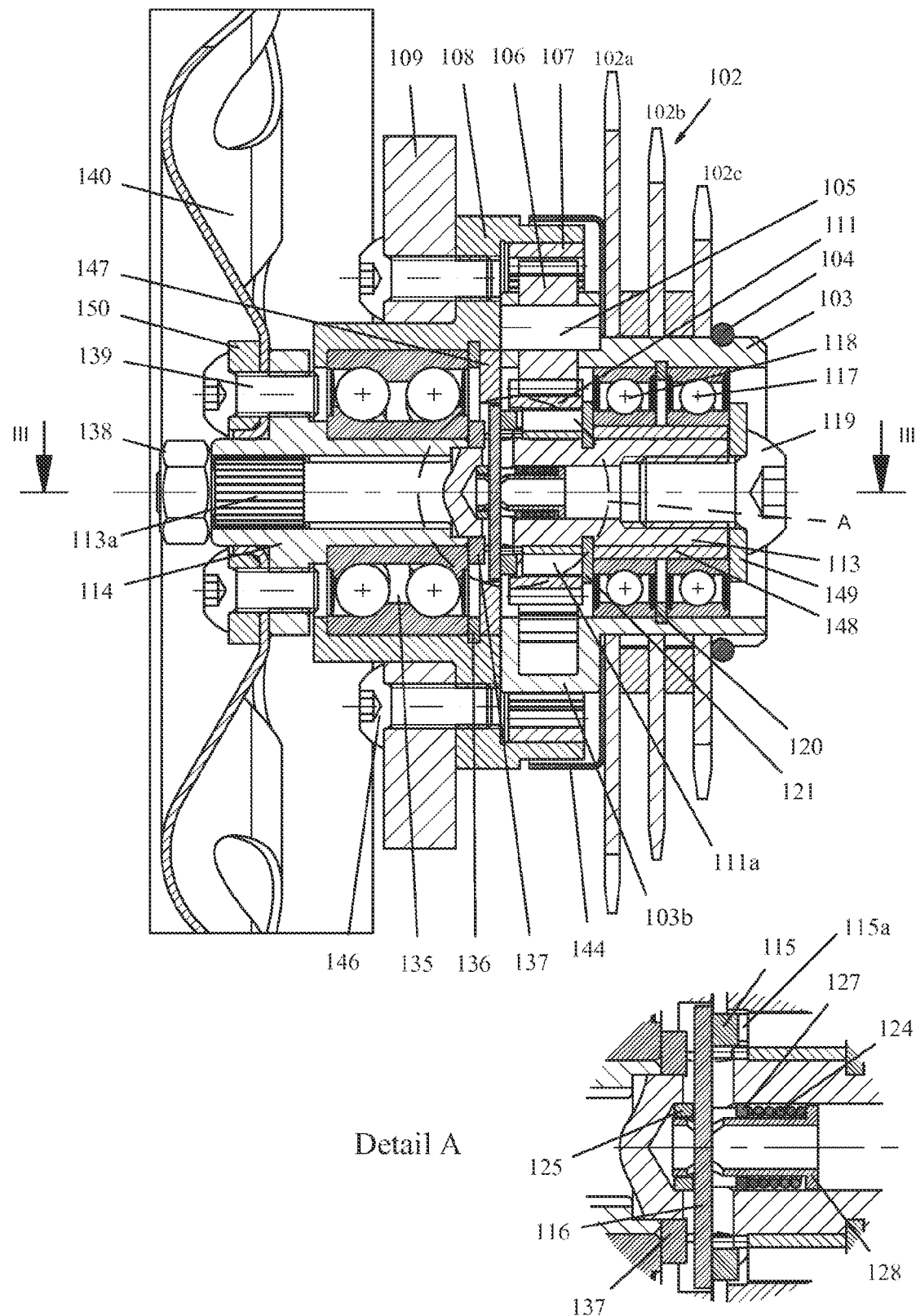
FIG. 8 shows a preferred second embodiment of the transmission unit as a single-gear transmission unit comprising a spur gear jaw freewheel clutch and a single-arm suspension of the transmission unit in the bicycle frame, meaning, in combination with an upstream endless chain drive comprising a double chain wheel and three driven crown gears, that a six-gear transmission having uniform gear shifting can be implemented.

FIG. 8 is a sectional view of a further preferred embodiment of the transmission unit comprising one gear ratio of the planetary gearing system. For reasons of clarity, the parts of the transmission unit which have been described in relation to FIG. 1 and are shown with an equivalent function in FIG. 8 are denoted in FIG. 8 by a number 100 higher than in FIG. 1. Unless a different description is given in the following, the description of the parts in FIG. 1 should also be transferred to the corresponding parts in FIG. 8.

By comparison with the embodiment shown in FIG. 1, the following aspects are modified in the embodiment of the transmission unit shown in FIG. 8:

a. The transmission is in the form of a single-gear transmission, and for implementing a plurality of gear ratios for the drive system of the bicycle, a plurality of driven crown gears 102a, 1102b and 102c are arranged on the driving mechanism 103.
b. A gap ring is provided between the sealing cap 144 and the ring gear carrier 108.
c. The clutch member 115 of the freewheel clutch only comprises radial toothing 115a on one side, and otherwise does not comprise any recesses for guiding the compression plate 116. The compression plate 116 is held in the radial position thereof by means of a disc 147.
d. The press-on mechanism for the clutch member 115 of the freewheel clutch makes it possible to arrange the compression spring 124 on the side of the compression plate 116 facing the driving mechanism 103.
e. The driving mechanism 103 is borne by two bearings 117 and 118 which are borne on the drive shaft 113, in this case by means of a bushing 148.
f. The rear wheel 140 is configured in such a way that it can be fixed directly to the rear wheel flange 114.
g. The shaft-hub connection between the drive shaft 113 and the rear wheel flange 114 is in the form of a toothed shaft connection 113a.

Regarding point a., the transmission is in the form of a single-gear transmission and the clutch member 115 merely has to be a freewheel clutch and does not have to be shiftable. Instead of a driven wheel, in the embodiment of FIG. 1 a driven crown gear packet 102 comprising a plurality of driven crown gears 102a, 102b, 102c etc. is used. In combination with a conventional commercial double chain wheel, and whilst using a suitable rear derailleur which shifts the driven crown gears 102a, 102b, 102c—these principles being known for derailleur gear sets—a six-gear chain transmission having uniform gear shifting and a short chain line distance for the bicycle can be implemented.

Regarding point b., in the embodiment shown in FIG. 8, the sealing between the sealing cap 144 and the ring gear carrier 108 is provided by way of a simple gap ring, which is a cost-effective embodiment in particular for more viscous lubricants.

Regarding point c., in accordance with a particular feature of the invention, the clutch member 115 of the freewheel clutch is of the following particularly compact construction: the clutch member 115 only comprises a radial toothing 115a on one end face, and the clutch member 115 does not comprise any recesses for receiving and guiding the compression plate 116. The compression plate 116 may be made rectangular and without any further recesses. In accordance with a further particular feature of the invention, a disc 147 is arranged between the retaining ring 136 and the planet carrier 103b in an axial perspective, and holds the compression plate 116 in position from a radial perspective.

Figure 9:
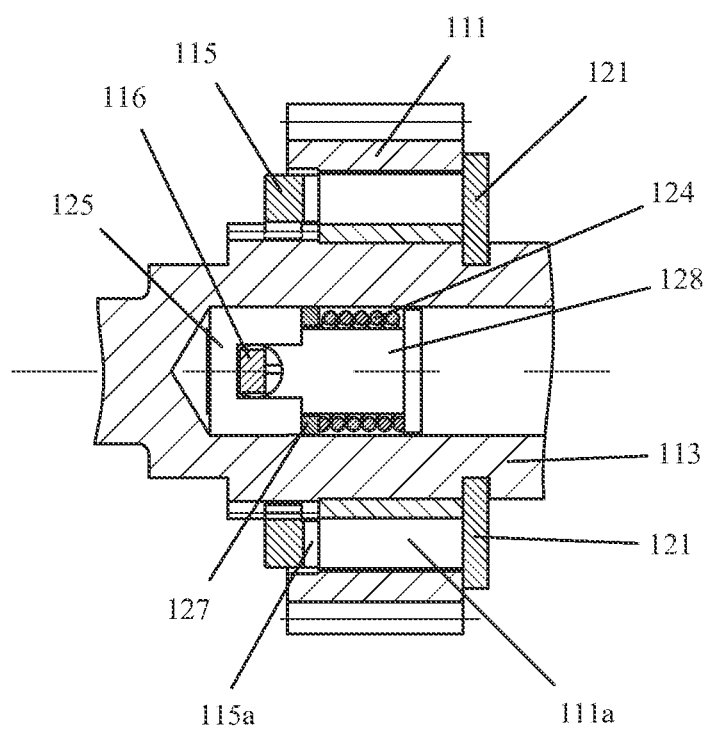
FIG. 9 shows the partially sectional view III-III of the freewheel clutch of FIG. 8.

Regarding point d., since the clutch member 115 is positioned closer to the angular contact ball bearing 135 from an axial perspective than in FIG. 1, but on the other hand an interconnected rear wheel flange 114 and drive shaft 113 are used as in FIG. 1, in FIG. 8 there is not sufficient installation space available between the compression plate 116 and the angular contact ball bearing 135 from an axial perspective for the compression spring 124 of the freewheel clutch. In accordance with a particular feature of the invention, the compression spring 124 is arranged on the side of the compression plate 116 facing the driving mechanism 103, using the arrangement disclosed in the following. FIG. 9 shows the elements disclosed in the following of the freewheel clutch in the partially sectional view III-III of FIG. 8. A compression sleeve 125 comprising two limbs, which is braced in the drive shaft 113, holds a washer 127 at a distance from the compression plate 116. The compression spring 124 is braced on the washer 127, and in turn exerts an axial force on a guide bushing 128. The guide bushing 128 comprises a continuous recess, preferably a hole, in which the compression plate 116 is accommodated. The guide bushing 128 in turn conveys the compressive force of the compression spring 124, inside the compression spring 124 and inside the compression sleeve 125 from a radial perspective, to the other side of the compression plate 116 from an axial perspective. Via the hole in the guide bushing 128, the compression plate 116 is finally pressed against the clutch member 115. As stated in the descriptions of FIG. 3 and FIG. 4, in this embodiment too the clutch member 115 is pressed out of the recesses 111a of the sun gear 111 by the bevels of the radial teeth 115a of the clutch member 115 in this embodiment too. In this case, the guide bushing 128 presses the compression spring 124 against the washer 127, which is braced on the compression sleeve 125 and on the drive shaft 113. The embodiment of the freewheel clutch having the particular features disclosed above makes a particularly compact freewheel clutch possible, which can transmit high torques and requires a minimal installation space from an axial perspective.

Regarding point e., the driving mechanism 103 shown in FIG. 8 is rotatably borne on a spacer bushing 148 by means of two bearings 117 and 118, preferably by means of two grooved ball bearings. The spacer bushing 148 is in turn slid onto the drive shaft 113. In accordance with a particular feature of the invention, the driving mechanism 103 is secured against axial displacement by a retaining ring 120, which is attached between the two bearings 117 and 118 in a groove of the driving mechanism 103. Instead of a retaining ring, the driving mechanism 103 could also comprise an offset which is arranged between the bearings 117 and 118. This embodiment is also included in the invention. The screw 119, together with a washer 149, fixes the bearings 117 and 118, which are attached to the spacer bushing 148, axially against a further retaining ring 121, which is arranged on the drive shaft 113 between the sun gear 111 and the bearing 118. The retaining ring 121 is positioned on the drive shaft 113 in such a way that there is always sufficient space between the planet carrier 103b and the ring gear carrier 108 from an axial perspective, and the driving mechanism 103 forming the planet carrier 103b is axially fixed freely rotating on the drive shaft 113.

Regarding point f., it is shown in this embodiment by way of example that the rear wheel 140 can be configured in such a way that it is directly connected to the rear wheel flange 114. Therefore, for further clarification: the rear wheel flange 114 may take on a number of different rear wheel forms, in this embodiment a rear wheel 140 formed from deep-drawn and punched sheet metal, which is fixed to the rear wheel flange 114 by means of a fixing plate 150 and fixing screws 139 and which comprises a conventional commercial rear wheel rim (not shown here), externally from a radial perspective, on which a conventional commercial bicycle tyre (also not shown) can also be mounted. In accordance with a particular feature of the invention, in this way short chain line distances can be implemented, since the central reference plane of the rear wheel 140 can be displaced in the direction of the bicycle frame 109 depending on the shape and configuration of the rear wheel 140.

Regarding point g., in this embodiment, in accordance with a particular feature of the invention, a toothed shaft connection 113a, for example the tooth shaft connection 7×8 in accordance with DIN 5481 shown in FIG. 8, is used as the shaft-hub connection between the drive shaft 113 and the rear wheel flange 114. Using the toothed shaft connection 113a makes it possible to transmit a high torque with a low radial installation space, in such a way that the particularly small double-row angular contact ball bearing 3201BTNG or else the double-row grooved ball bearing 4201BTNG can be used in this preferred embodiment. In this case, the drive shaft 113 and the rear wheel flange 114 are secured against one another by a counter nut 138 which is screwed onto the drive shaft 113.

FIG. 9 is the partially sectional view III-III of the freewheel clutch of FIG. 8 comprising the pressure plate 116, the compression spring 124 arranged inside the drive shaft 113, the compression sleeve 125 and the guide bushing 128.

Figure 10:
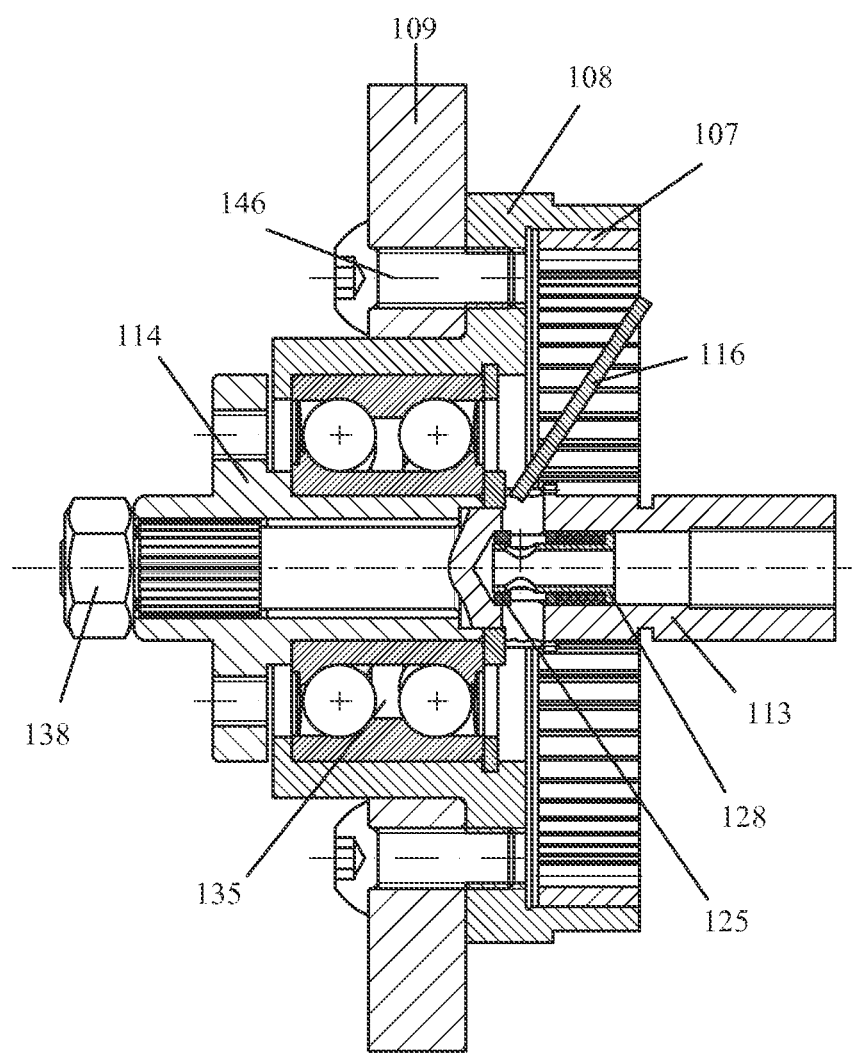
FIG. 10 shows how the freewheel clutch of the transmission unit of FIG. 8 can be mounted without the need to assemble major parts of the transmission unit.

As is shown in FIG. 10, in accordance with a further particular feature of the invention, the loose arrangement of the compression plate 116 in the recesses of the drive shaft 113 and the guide bushing 128, made possible by the disc 147, makes it possible, even in this embodiment of the transmission unit as a single-gear transmission unit, to install and uninstall the compression plate 116 and the clutch member 115 of the freewheel clutch, without the rear wheel 140, the rear wheel flange 114, the drive shaft 113, the angular contact ball bearing 135, the ring gear 107 or the ring gear carrier 108 having to be uninstalled Thus, the required rigid fits can be provided between the angular contact ball bearing 135 and the rear wheel flange 114 and optionally between the angular contact ball bearing 135 and the ring gear carrier 108.

Figure 11:
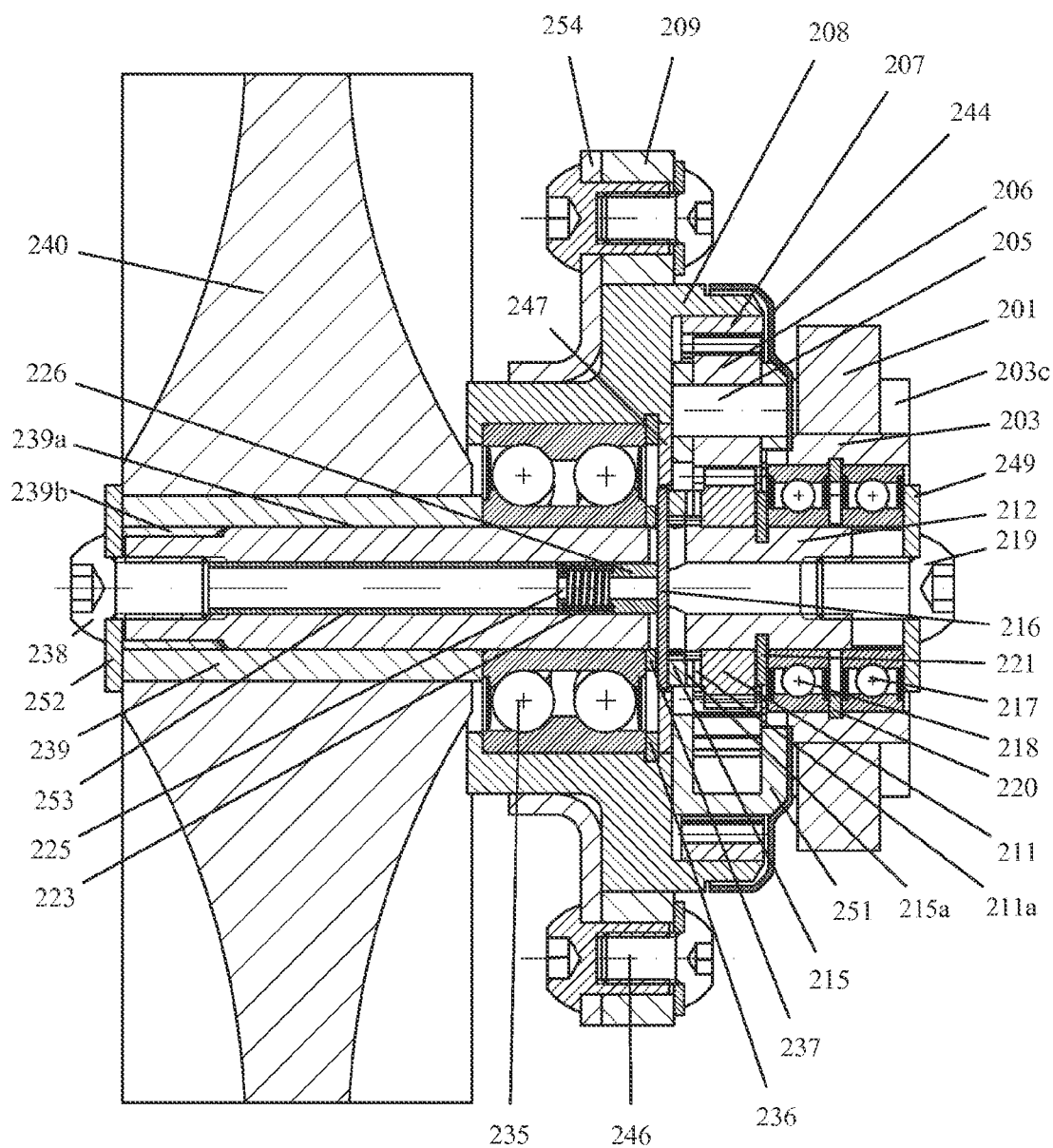
FIG. 11 shows a preferred third embodiment of the transmission unit as a particularly compact single-gear transmission unit which is simple to manufacture, having a single-piece rear wheel shaft, with variable rear wheel fixing and variable fixing of the transmission unit in the bicycle frame.

FIG. 11 shows a further, preferred and particularly compact and simply configured single-gear embodiment of the transmission unit. The aim of this embodiment is to make production more cost-effective than in the embodiments of FIG. 1 and FIG. 8. For reasons of clarity, the parts of the transmission unit which have been described in relation to FIG. 1 or FIG. 8 and are shown with an equivalent function in FIG. 11 are denoted by a number 200 higher than in FIG. 1 or a number 100 higher than in FIG. 8. Unless a different description is given in the following, the description of the parts in FIG. 1 or FIG. 8 should also be transferred to the corresponding parts in FIG. 11. By comparison with the embodiment shown in FIG. 8, the following aspects are modified in the embodiment of the transmission unit shown in FIG. 11:

a. The drive shaft and the rear wheel flange are formed in a single piece and are combined to form the rear wheel shaft 212.
b. The configuration of the sun gear 211 makes smaller numbers of teeth and thus smaller overall transmission ratios possible.
c. The real wheel 240 is fixed, and the torque is transmitted from the rear wheel shaft 212 to the rear wheel 240, by way of a simple threaded sleeve 239, which is screwed onto the rear wheel shaft 212, in the rear wheel 240.
d. All of the components of the freewheel mechanism are arranged loosely in succession from an axial perspective.
e. The suspension of the transmission unit in the bicycle frame 209 is displaced further towards the planetary gearing system from an axial perspective.
f. The driving mechanism 203 and the planet carrier 251 are formed in two parts. The driving mechanism 203 forms the driven wheel 203c of a toothed belt drive upstream from the transmission unit.

Regarding point a., in this embodiment the drive shaft and the rear wheel flange are formed in a single piece and are combined to form the rear wheel shaft 212.

Regarding point b., in this embodiment the sun gear 211 is provided with an end-face radial toothing 211a or with end-face jaws in which the radial teeth 215a of the clutch member 215 can engage. This has the advantage that a smaller number of teeth can be selected for the sun gear 211, and a smaller overall transmission ratio for the transmission unit can thus be achieved. In the case of freewheeling, the jaws or radial teeth 211a of the sun gear 211 press the radial teeth 215a of the clutch member 215 out of the radial tooth connection.

Regarding point c., between the angular contact ball bearing 235 and the involute toothing of the rear wheel shaft 212, a washer 237 which may also be formed as a retaining ring acts as a shaft-side support shoulder for the angular contact ball bearing 235. A rear wheel 240, which comprises a threaded sleeve 239 internally from a radial perspective, is screwed onto the rear wheel shaft 212, by means of a thread which connects the rear wheel 240 and the rear wheel shaft 212, and presses the angular contact ball bearing 235 against the washer 237 for the purpose of axially fixing the angular contact ball bearing 235 on the rear wheel shaft 212. By selecting a suitable fit, a fit portion 239a of the threaded sleeve 239 can be rigidly connected to the rear wheel shaft 212 in a rigid fit, and carries the loads due to gravity and due to the road. The torque is transmitted between the rear wheel shaft 212 and the rear wheel 240 substantially via the threaded portion 239b of the threaded sleeve 239. The threaded sleeve which carries the rear wheel 240 is secured by means of a screw 238 and a washer 252.

Regarding point d., the configuration of the drive shaft and the rear wheel flange in a single piece as the rear wheel shaft 212 creates space inside the rear wheel shaft, in such a way that, unlike in the embodiment shown in FIG. 8, the compressive force of the compression spring 223 no longer has to be diverted, and the compression spring 223 can be placed on the side of the compression plate 216 facing the rear wheel 240. The compression spring 223 is supported on the screw 238 via a guide tube 253. In accordance with a further particular feature of the invention, in this embodiment the guide bushing 225, the compression spring 223, the guide bushing 226, the compression plate 216 and the clutch member 215 are simply pressed against the sun gear 211, arranged loosely in succession from an axial perspective without further axially acting guide or fixing means. By way of this arrangement, as shown previously in FIG. 10 for the single-gear variant of the transmission unit, it is again possible to mount the compression plate 216 without dismounting the major parts of the transmission (angular contact ball bearing 235, ring gear carrier 208, ring gear 207, rear wheel shaft 212).

Regarding point e., in a variant of the fixing of the transmission unit in the bicycle frame 209, a connecting flange 254 which is rigidly connected radially and laterally to the ring gear carrier 208 comprises holes on the periphery thereof which are flush with the holes of the bicycle frame 209, and is fixed to the ring gear carrier 208 via the bicycle frame 209 by means of screw connections 246. The axial offset of the bicycle frame 209 in the direction of the planetary gearing system which is thus achieved has the advantage over the embodiments of FIG. 1 and FIG. 8 that the outside of the bicycle frame 209 can extend from the transmission unit to the pedal in a straight light parallel to the central reference plane of the bicycle.

Regarding point f., in this embodiment the driving mechanism 203 forms the driven wheel 203c of a toothed belt drive upstream from the transmission unit. Furthermore, the driving mechanism 203 and the planet carrier 251 are formed in two parts. The shaft-hub connection between the driving mechanism 203 and the planet carrier 251 is implemented in a compact manner using a jaw clutch.

Figure 12:
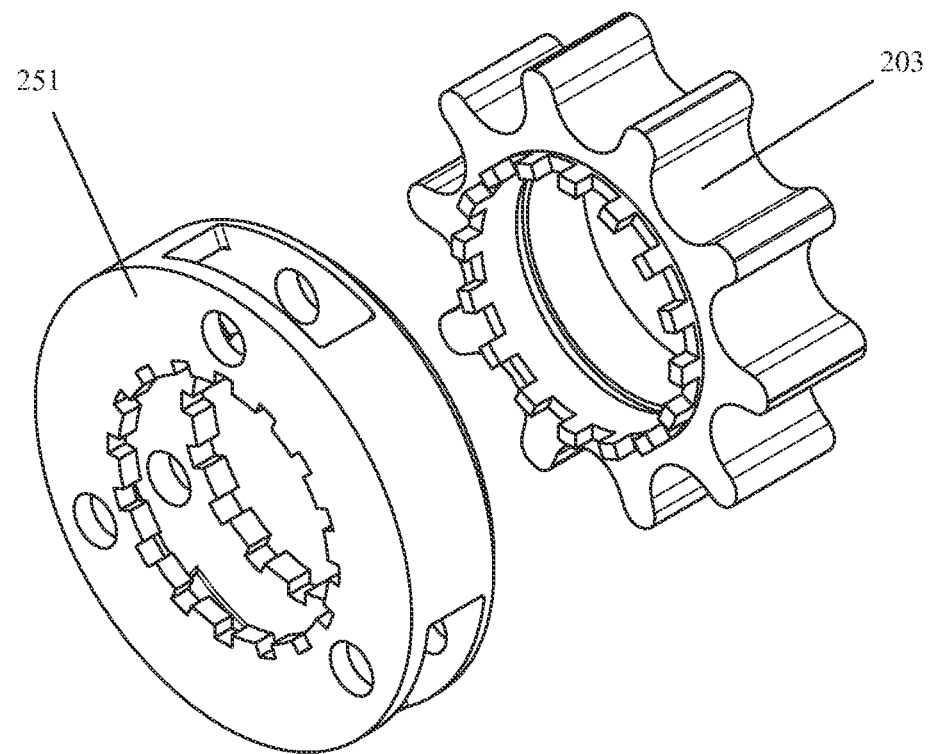
FIG. 12 shows the jaw clutch between the driving mechanism of the transmission unit and the planet carrier of the planetary gearing system in the exploded view.

FIG. 12 is an exploded view of torque-proof jaw clutch between the driving mechanism 203 and the planet carrier 251.

As a result, by way of the above-disclosed particular features of the invention, as demonstrated using the embodiments shown in FIG. 1, FIG. 8 and FIG. 11, very short chain line distances of approximately 37-55 mm, depending on the rear wheel width, can be achieved as a result of the cranked driven wheel 2, as a result of the freedom of configuration of the rear wheel 40, 140 and the fact that the fixing of the rear wheel 40, 140 to the rear wheel flange 14, 114 or on the rear wheel shaft 212 thus need not be in the central reference plane, and as a result of the particularly compact shape of the freewheel means and shifting means. A 10-inch, fully plastics material idle wheel results in for example approximately the following chain line distance (FIG. 11):

| | |
|---|---|
| Width of the rear wheel divided by two: | 34/2 = 17 mm |
| Minimum distance of the rear wheel from the bicycle frame: | +4 mm |
| Width of the bicycle frame at the level of the rear wheel: | +8 mm |
| Distance of the chain from the bicycle frame: | +3 mm |
| Chain width divided by 2: | 10/2 = +5 mm |
| Resulting chain line distance from the central reference plane of the bicycle | =37 mm |

A 12-inch or 14-inch pneumatic tyre idle wheel having a two-gear transmission unit results in for example approximately the following chain line distance (FIG. 1):

| | |
|---|---|
| Width of the rear wheel divided by two: | 40/2 = 20.0 mm |
| Minimum distance of the rear wheel from the bicycle frame: | +6.0 mm |
| Width of the bicycle frame: | +8.0 mm |
| Material thickness of the ring gear carrier between the bicycle frame and the planet carrier | +2.0 mm |
| Width of the planet carrier: | 3 + 15 + 3.5 = + 20.5 mm |
| Material thickness of the sealing cap | 0.5 mm |
| Width of the driven crown gear divided by 2: | 2/2 = + 1.0 mm |
| Chain line offset due to cranked driven crown gear | −2.7 mm |
| Resulting chain line distance from the central reference plane of the bicycle | =55.3 mm |

For the embodiments shown in FIG. 1, FIG. 8 and FIG. 11, the connection, required for absorbing the forces (gravity, road impacts) and moments (bracing moment of the ring gear) brought about during use, between the ring gear carrier (8, 108, 208) and the bicycle frame (9, 109, 209) may be made releasable (for example by screwing), as shown, or else in a material fit (by soldering, gluing, welding or forming in a single piece). Embodiments comprising material connections between the bicycle frame (9, 109, 209) and the ring gear carrier (8, 108, 208) or ring gear (7, 107, 207) are also included in the invention.

Further embodiments of the invention, which are readily accessible to a person skilled in the art and are therefore not shown, involve for example configuring the shaft-hub connection between the sun gear and the rear wheel shaft for the single-gear transmission unit as a feather key connection. This makes possible a rear wheel shaft which is simple to produce. Likewise, the rear wheel shaft and the sun gear for the single-gear transmission unit may be formed in one piece, in such a way that the rear wheel shaft simultaneously acts as a sun gear. In this case, in particular for using particularly small idle wheels, low transmissions of the transmission unit of for example up to 1:5 can be achieved.

For these last two embodiments of the rear wheel shaft and the sun gear, the freewheel clutch according to FIG. 15 may be arranged between the rear wheel shaft and the rear wheel hub.

The freewheel clutch can also be arranged between the driven wheel (2, 102, 202, 302) of the traction mechanism transmission or spur gear transmission upstream from the transmission unit and the driving mechanism (3, 103, 203, 303), for example by means of a detent freewheel clutch, which is commercially conventional in particular for BMX bicycles, or by means of a pinion package, which is commercially conventional in particular for derailleur gear sets. However, the advantage of cost-effective production is countered by the drawback that in the case of freewheeling the planet carrier (3b, 103b, 251, 303b) and the planet gears (6, 106, 206, 306) rotate together, resulting in losses of efficiency. All of these embodiments are included in the invention.

By way of the aforementioned embodiments, the transmission ratios described in greater detail in the following by way of example can be implemented. In this context, by way of example, reference is made to configuring the gearwheels with a modulus of 0.8 in accordance with FIG. 8 and FIG. 11. Other gearwheel modules which are used as regards the solidity are also included in the invention. In the following, for the above-disclosed embodiments, exemplary and preferred combinations of chain wheels, driven crown gears and numbers of teeth of the planetary gearing systems are described, which belong to the preferred embodiments of the planetary gearing system as a six-gear transmission comprising uniform gear shifting and/or which can be adapted to a plurality of idle wheel sizes in a particularly simple manner by way of a suitable selection of the driven crown gear.

Since the resulting transmission ratios come out as very small numbers, it has been chosen to represent the transmission ratios in the form of a prefixed ratio "1:". In each line, for the transmission shown of the respective gear ratio, the divisor of the transmission ratio of 1: is given. A transmission of 0.125 is thus represented as =1:8.

When a conventional commercial double chain wheel comprising 42 and 27 teeth is used, with the embodiment shown in FIG. 8, a uniform gear shift between 13.1% and 18.8% and a transmission ratio range of approximately 210% between the smallest and largest gear are achieved:

TABLE A

| six-gear transmission for 14-inch and 12-inch wheels | | | | | | |
|---|---|---|---|---|---|---|
| Chain drive gear | 1 | 2 | 3 | 4 | 5 | 6 |
| Drive chain wheel number of teeth | 27 | 27 | 27 | 42 | 42 | 42 |
| Driven crown gear number of teeth | 25 | 22 | 19 | 25 | 22 | 19 |
| Chain drive transmission ratio = 1: | 1.08 | 1.23 | 1.42 | 1.68 | 1.91 | 2.21 |
| Planetary gearing system gear | 1 | 1 | 1 | 1 | 1 | 1 |
| Ring gear number of teeth | 61 | 61 | 61 | 61 | 61 | 61 |
| Planet gear number of teeth | 16 | 16 | 16 | 16 | 16 | 16 |
| Sun gear number of teeth | 29 | 29 | 29 | 29 | 29 | 29 |
| Planetary gearing system transmission ratio = 1: | 3.1 | 3.1 | 3.1 | 3.1 | 3.1 | 3.1 |
| Overall transmission gear | 1 | 2 | 3 | 4 | 5 | 6 |
| Overall transmission ratio = 1: | 3.4 | 3.8 | 4.4 | 5.2 | 5.9 | 6.9 |
| Ratio increment | | 13.6% | 15.8% | 18.2% | 13.6% | 15.8% |
| Deployment of 14-inch wheel in m/pedal rotation | 3.6 | 4.1 | 4.7 | 5.6 | 6.3 | 7.3 |
| Chain drive gear | 1 | 2 | 3 | 4 | 5 | 6 |
| Drive chain wheel number of teeth | 27 | 27 | 27 | 42 | 42 | 42 |
| Driven crown gear number of teeth | 22 | 19 | 16 | 22 | 19 | 16 |
| Chain drive transmission ratio = 1: | 1.23 | 1.42 | 1.69 | 1.91 | 2.21 | 2.63 |
| Planetary gearing system gear | 1 | 1 | 1 | 1 | 1 | 1 |
| Ring gear number of teeth | 61 | 61 | 61 | 61 | 61 | 61 |
| Planet gear number of teeth | 16 | 16 | 16 | 16 | 16 | 16 |
| Sun gear number of teeth | 29 | 29 | 29 | 29 | 29 | 29 |
| Planetary gearing system transmission ratio = 1: | 3.1 | 3.1 | 3.1 | 3.1 | 3.1 | 3.1 |
| Overall transmission gear | 1 | 2 | 3 | 4 | 5 | 6 |
| Overall transmission ratio = 1: | 3.8 | 4.4 | 5.2 | 5.9 | 6.9 | 8.1 |
| Ratio increment | | 15.8% | 18.8% | 13.1% | 15.8% | 18.8% |
| Deployment of 12-inch wheel in m/pedal rotation | 3.4 | 4.0 | 4.7 | 5.3 | 6.2 | 7.3 |

TABLE B

| six-gear transmission for 10-inch wheel | | | | | | |
|---|---|---|---|---|---|---|
| Chain drive gear | 1 | 2 | 3 | 4 | 5 | 6 |
| Drive chain wheel number of teeth | 27 | 27 | 27 | 42 | 42 | 42 |
| Driven crown gear number of teeth | 19 | 16 | 14 | 19 | 16 | 14 |
| Chain drive transmission ratio = 1: | 1.42 | 1.69 | 1.93 | 2.21 | 2.63 | 3.00 |
| Planetary gearing system gear | 1 | 1 | 1 | 1 | 1 | 1 |
| Ring gear number of teeth | 61 | 61 | 61 | 61 | 61 | 61 |
| Planet gear number of teeth | 16 | 16 | 16 | 16 | 16 | 16 |
| Sun gear number of teeth | 29 | 29 | 29 | 29 | 29 | 29 |
| Planetary gearing system transmission ratio = 1: | 3.1 | 3.1 | 3.1 | 3.1 | 3.1 | 3.1 |
| Overall transmission gear | 1 | 2 | 3 | 4 | 5 | 6 |
| Overall transmission ratio = 1: | 4.4 | 5.2 | 6.0 | 6.9 | 8.1 | 9.3 |
| Ratio increment | | 18.8% | 14.3% | 14.6% | 18.8% | 14.3% |
| Deployment of 10-inch wheel in m/rotation | 3.5 | 4.2 | 4.8 | 5.5 | 6.5 | 7.4 |

The single-gear transmission unit shown in FIG. 11 can be adapted to wheel sizes of 7 to 16 inches, in such a way that the same expedient deployment is achieved, simply by using a different drive crown gear with a varied number of teeth:

TABLE C

| identical single-gear transmission unit for idle wheel sizes of 7 inches to 16 inches | | | | | | |
|---|---|---|---|---|---|---|
| Chain drive gear | 1 | 1 | 1 | 1 | 1 | 1 |
| Drive chain wheel number of teeth | 38 | 38 | 38 | 38 | 38 | 38 |
| Driven crown gear number of teeth | 13 | 15 | 18 | 20 | 24 | 28 |
| Chain drive transmission ratio = 1: | 2.92 | 2.53 | 2.11 | 1.9 | 1.58 | 1.36 |

TABLE C-continued identical single-gear transmission unit for
idle wheel sizes of 7 inches to 16 inches

| | | | | | | |
|---|---|---|---|---|---|---|
| Planetary gearing system gear | 1 | 1 | 1 | 1 | 1 | 1 |
| Ring gear number of teeth | 57 | 57 | 57 | 57 | 57 | 57 |
| Planet gear number of teeth | 15 | 15 | 15 | 15 | 15 | 15 |
| Sun gear number of teeth | 27 | 27 | 27 | 27 | 27 | 27 |
| Planetary gearing system transmission ratio = 1: | 3.11 | 3.11 | 3.11 | 3.11 | 3.11 | 3.11 |
| Overall transmission ratio = 1: | 9.1 | 7.9 | 6.6 | 5.9 | 4.9 | 4.2 |
| Wheel size in inches | 7 | 8 | 10 | 12 | 14 | 16 |
| Deployment in m/pedal rotation | 5.3 | 5.2 | 5.3 | 5.3 | 5.3 | 5.2 |

Aside from the embodiments shown, with the above-disclosed particular features of the invention a number of further transmission ratios can be implemented, and are all included in the invention.

For example, in an embodiment in which the rear wheel shaft and the sun gear are formed in one piece, the sun gear may comprise even smaller numbers of teeth, meaning that the transmission unit can be used for extremely small idle wheel sizes. In the following, a possible embodiment and the possible adaptation to idle wheel sizes of 6 to 14 inches by varying the driven crown gear are shown.

TABLE D identical single-gear transmission unit for
idle wheel sizes of 6 inches to 14 inches

| | | | | | |
|---|---|---|---|---|---|
| Chain drive gear | 1 | 1 | 1 | 1 | 1 |
| Drive chain wheel number of teeth | 32 | 32 | 32 | 32 | 32 |
| Driven crown gear number of teeth | 13 | 17 | 21 | 24 | 28 |
| Chain drive transmission ratio = 1: | 2.46 | 1.88 | 1.52 | 1.33 | 1.14 |
| Planetary gearing system gear | 1 | 1 | 1 | 1 | 1 |
| Ring gear number of teeth | 60 | 60 | 60 | 60 | 60 |
| Planet gear number of teeth | 21 | 21 | 21 | 21 | 21 |
| Sun gear number of teeth | 18 | 18 | 18 | 18 | 18 |
| Planetary gearing system transmission ratio = 1: | 4.33 | 4.33 | 4.33 | 4.33 | 4.33 |
| Overall transmission ratio = 1: | 10.7 | 8.2 | 6.6 | 5.8 | 5.0 |
| Wheel size in inches | 6 | 8 | 10 | 12 | 14 |
| Deployment in m/pedal rotation | 5.3 | 5.4 | 5.3 | 5.2 | 5.3 |

Overall, by selecting the number of teeth of the planetary gearing system appropriately, transmission ratios of the planetary gearing system of approximately 1:4.5 to 1:5.0 and less can be achieved.

LIST OF REFERENCE NUMERALS 1, 301 Chain of the chain drive
201 Belt of the belt drive
2, 102, 203c Driven wheels of the traction mechanism transmission or spur gear transmission
3, 103, 203 Driving mechanism
3b, 103b, 251b Planet carrier
4, 104 Retaining rings for driven wheel
5, 105, 205 Planet axles
6a, 6b, 106, 206 Planet gears
7, 107, 207 Ring gear
8, 108, 208 Ring gear carrier
9, 109, 209 Bicycle frame
10 Sun gear
11, 111, 211 Sun gear
12, 112, 212 Rear wheel shaft
13, 113 Drive shaft of the rear wheel shaft
14, 114 Rear wheel flange of the rear wheel shaft
15, 115, 215 Clutch member
16, 116, 216 Compression plates of the freewheel clutches
17, 117, 217 Bearing for driving mechanism
18, 118, 218 Bearing for driving mechanism
19, 119, 219 Fixing screw for bearing for driving mechanism
20, 120, 220 Retaining rings for bearing for driving mechanism
21, 22 Spacers for sun gears
121, 221 Retaining rings for sun gears
23, 24, 124, 223 Compression springs for the shifting means and clutch means
25, 26, 27, 28, 125, 127, 128, Guide bushings/washers for compression spring, compression
225, 226 plate/piece
29 Shifting screws of the shifting means
30 Shifting nuts of the shifting means
31 Shifting chain
32 Needle bearing for shifting chain
33 Guide bushing for shifting chain
34 Bearing for shifting chain
35, 135, 235 Bearing for rear wheel shafts
36, 136, 236 Retaining rings for bearing for rear wheel shaft—ring gear carrier
37, 137, 237 Applied discs for bearing for rear wheel shaft
38, 138 Counter nut
238 Counter screw
39, 139 Fixing screws for rear wheel
239 Threaded sleeve for fixing the rear wheel
339 Fixing nut for fixing the rear wheel
40, 140, 240 Rear wheel
41 Sealing plug
42, 43 Sealing rings
44, 144, 244 Sealing caps for the planetary gearing system
45 Applied cap for the O-ring seal
46, 146, 246 Fixing screws for transmission unit—bicycle frame
147, 247 Disc for radially positioning the compression plate
148 Bearing bushing for bearing for driving mechanism
149, 249, 252 Washers for fixing screws and counter screws
253 Guide tube in the rear wheel shaft
254 Connecting flange for bicycle frame—ring gear carrier

What is claimed is:

1. A transmission unit with a planetary gearing system comprising:
   a. a planetary gearing system including a ring gear connected to a bicycle frame in a rotatably fixed manner, a planet carrier with planet gears, and at least one sun gear that is engaged with the planet gears,
   b. a rear wheel shaft that is coaxial with respect to the sun gear and having a first bearing disposed thereon,
   c. a driving mechanism that is operatively rotationally engaged with the planet carrier, the driving mechanism being borne radially by the first bearing,
   d. at least one second bearing that bears the rear wheel shaft with respect to the bicycle frame, the second bearing being arranged axially between the planetary gearing system and a seat of the rear wheel, wherein the at least one second bearing radially bears the rear wheel shaft inside and is connected, either directly or indirectly, to the bicycle frame, externally from a radial perspective,
   wherein the transmission unit provides at least one transmission ratio between a driving mechanism and the rear wheel shaft.

2. The transmission unit as recited in claim 1, wherein the bicycle frame is a frame of a trailer bicycle.

3. The transmission unit as recited in claim 1, wherein the planetary gearing system and the seat of the rear wheel are arranged on the rear wheel shaft on different sides of the bicycle frame.

4. The transmission unit as recited in claim 1, wherein a driven wheel of a traction mechanism transmission upstream from the transmission unit and the planetary gearing system are arranged on the same side of the bicycle frame as a drive wheel, which is driven by a cyclist, of the traction mechanism transmission.

5. The transmission unit as recited in claim 1, wherein a driven wheel of a spur gear transmission upstream from the transmission unit and the planetary gearing system are arranged on the same side of the bicycle frame as a drive wheel, which is driven by a cyclist, of the spur ear transmission.

6. The transmission unit as recited in claim 1, wherein the transmission unit has a clutch member, which is operatively rotationally engaged with the rear wheel shaft for transferring torque from the sun gear to the rear wheel shaft.

7. The transmission unit as recited in claim 6, wherein the clutch member is axially displaceable.

8. The transmission unit as recited in claim 7, wherein a compression piece, which penetrates the rear wheel shaft perpendicular to a longitudinal axis of the rear wheel shaft and is arranged in a corresponding recess in the rear wheel shaft, displaces the clutch member outside, from a radial perspective, and on both sides of the rear wheel shaft with respect to the sun gear.

9. The transmission unit as recited in claim 8, further comprising a compression spring arranged inside a hollow cylindrical part of the rear wheel shaft, wherein the compression spring displaces the compression piece and thus the clutch member with respect to the sun gear.

10. The transmission unit as recited in claim 9, further comprising a compression sleeve with two limbs extending on the two sides of the compression piece disposed inside the hollow cylindrical part of the rear wheel shaft, the compression sleeve being braced in the rear wheel shaft towards the rear wheel in an axial perspective and holding the compression spring at a distance from the face of the compression piece facing the sun gear, the compression spring axially displacing a guide bushing, which is arranged inside the rear wheel shaft, has recesses for guiding the compression piece and displaces the compression piece against the clutch member and said member with respect to the sun gear.

11. The transmission unit as recited in 8, wherein the planetary gearing system has a stationary ring gear, a planet carrier, in each case two rigidly interconnected planet gears having different numbers of teeth, and two sun gears which are coaxial with the rear wheel shaft and engage with the planet gears, the planet gear arranged towards the bicycle frame engaging with the ring gear, and a clutch member, the shifting setting of which determines which of the two sun gears drives the rear wheel shaft, meaning that the transmission unit has two settable gear ratios, being downstream from the sun gears.

12. The transmission unit as recited in claim 11, wherein the clutch member is arranged inside the sun gear from a radial perspective.

13. The transmission unit as recited in claim 11, wherein a weaker compression spring is arranged inside the hollow cylindrical part of the rear wheel shaft on the face of the compression piece facing the rear wheel, and a stronger compression spring is arranged on the face of the compression piece facing the driving mechanism and, on the face thereof facing the compression piece, presses a guide bushing against the compression piece, thus implementing a two-gear shifter with a first gear ratio, which is set in that the stronger compression spring overcomes the compressive force of the weaker compression spring on the compression piece and presses the clutch member against the sun gear arranged with respect to the rear wheel, and with a second gear ratio, which is set in that a shifting chain leading out of the rear wheel shaft pulls the guide bushing and the stronger compression spring away from the compression piece and the weaker compression spring pushes the compression piece and the clutch member against the sun gear arranged with respect to the driving mechanism.

14. The transmission unit as recited in claim 13, wherein the guide bushing has a shifting screw, which is arranged centrally in the guide bushing and passed through a hole in the guide bushing and which is directly or indirectly connected to the shifting chain and can be pulled away from the compression piece, meaning that the compressive force of the stronger compression spring on the compression piece can be removed.

15. The transmission unit as recited in claim 6, wherein at least one of the clutch member and the sun gear includes bevels which press the clutch member out of the recesses of the sun gear when the rear wheel shaft rotates faster than the respective sun gear.

16. The transmission unit as recited in claim 15, wherein a freewheel clutch is arranged between the sun gear and the rear wheel shaft in the power train, the bevels of the clutch member and/or of the sun gears pushing the radial teeth of the clutch member out of the recesses of the sun gear when the rear wheel shaft rotates faster than the respective sun gear, and the clutch member being pushed axially against the sun gear by the compression springs, in such a way that the positive engagement, which is required for the torque transmission, of the radial teeth of the clutch member in the recesses of the respective sun gear takes place when the driven sun gear overtakes the rear wheel shaft.

17. The transmission unit as recited in claim 6, wherein the rear wheel shaft is formed in two parts, consisting of a first shaft part, on which the clutch member is arranged and on which the driving mechanism is borne, and a second shaft part, which is coaxially connected to the first and on which the rear wheel is placed and which is borne by the second bearing in the bicycle frame.

18. The transmission unit as recited claim 1, wherein the rear wheel shaft and the sun gear consist of a component produced in a single piece.

* * * * *